(12) United States Patent
Zaima

(10) Patent No.: US 8,804,217 B2
(45) Date of Patent: Aug. 12, 2014

(54) IMAGE FORMING APPARATUS WHICH PERFORMS CALIBRATION FOR MAINTAINING IMAGE QUALITY

(75) Inventor: Nobuhiko Zaima, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 13/196,140

(22) Filed: Aug. 2, 2011

(65) Prior Publication Data

US 2012/0033276 A1    Feb. 9, 2012

(30) Foreign Application Priority Data

Aug. 9, 2010   (JP) .................. 2010-178997

(51) Int. Cl.
- *H04N 1/46* (2006.01)
- *H04N 1/48* (2006.01)
- *G06K 15/02* (2006.01)

(52) U.S. Cl.
CPC .............. *H04N 1/484* (2013.01); *G06K 15/027* (2013.01)
USPC .......................................... 358/518; 358/509

(58) Field of Classification Search
USPC .......... 358/518, 504, 1.9, 3.1, 3.23, 519, 520, 358/530
See application file for complete search history.

(56) References Cited

U.S. PATENT DOCUMENTS

| 6,034,788 A | 3/2000 | Sasanuma et al. ............ 358/406 |
| 7,068,393 B2 | 6/2006 | Sasanuma et al. ............ 358/1.9 |
| 2002/0085235 A1 | 7/2002 | Degani et al. ............... 358/3.06 |
| 2005/0225784 A1 | 10/2005 | Jacob et al. ..................... 358/1.9 |
| 2007/0229923 A1 | 10/2007 | Itagaki et al. |
| 2009/0147289 A1* | 6/2009 | Fujita .............................. 358/1.9 |
| 2012/0020680 A1* | 1/2012 | Zaima ............................. 399/15 |

FOREIGN PATENT DOCUMENTS

| EP | 0 674 427 | 9/1995 |
| EP | 2 264 546 | 12/2010 |
| JP | 7-261479 | 10/1995 |
| JP | 8-287217 | 11/1996 |

OTHER PUBLICATIONS

European Search Report dated Jul. 11, 2011 in corresponding European Application No. 11176618.4.
Chinese Office Action dated Oct. 29, 2013 in Chinese Appl. No. 201110226072.4.

* cited by examiner

*Primary Examiner* — Jerome Grant, II
(74) *Attorney, Agent, or Firm* — Fitzpatrick, Cella, Harper & Scinto

(57) ABSTRACT

A reader unit A reads a pattern image formed on a first printing medium to obtain a first luminance value. A color processing unit converts into a density value using first conversion information. CPU creates an image processing condition LUTa based on the density value. A photo sensor reads a pattern image formed on an image carrier. CPU corrects LUTa based on a density value of the pattern image read by photo sensor. A printer unit forms a pattern image on a second printing medium different using the corrected LUTa. CPU determines second conversion information for the second printing medium based on a second luminance value from the pattern image on the second printing medium, the first luminance value and the first conversion information.

14 Claims, 18 Drawing Sheets

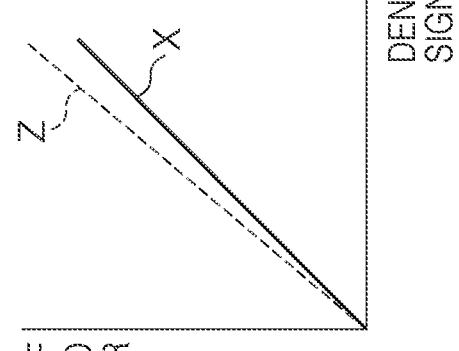
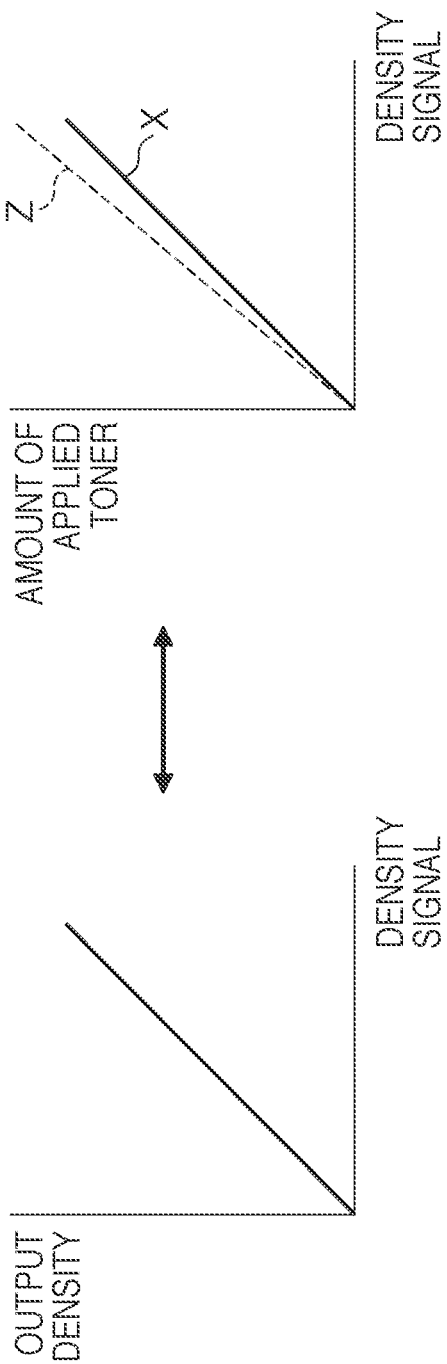

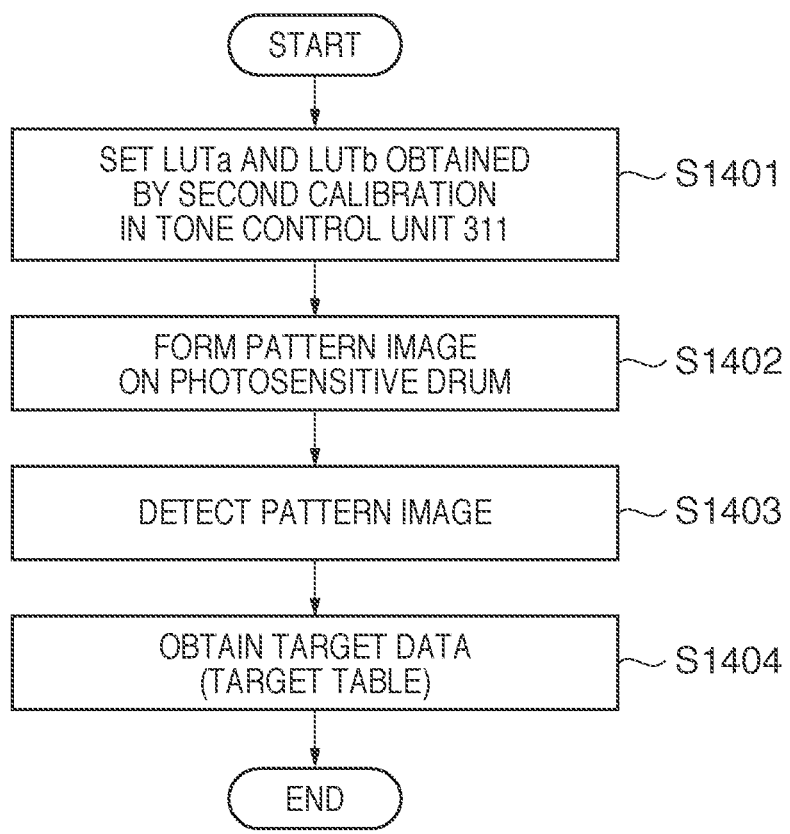

FIG. 17A

| | | LUTid | LUTa | LUTb |
|---|---|---|---|---|
| i | FIRST CALIBRATION AND SECOND CALIBRATION USING PRINTING MEDIUM X | PATTERN GENERATION | — | — | — |
| | | CORRECTION | USE OF INITIAL VALUE LUTid(X) | CREATION OF LUTa(X) | CREATION OF LUTb(X) |
| ii | THIRD CALIBRATION | PATTERN GENERATION | — | USE OF LUTa(X) | — |
| | | CORRECTION | — | UPDATING TO LUTa(X)' | — |
| iii | THIRD CALIBRATION WHEN ADDING PRINTING MEDIUM Z | PATTERN GENERATION | — | — | — |
| | | CORRECTION | — | UPDATING TO LUTa(X)" | — |
| iv | SECOND CALIBRATION WHEN ADDING PRINTING MEDIUM Z | PATTERN GENERATION | — | USE OF LUTa(X)" | — |
| | | CORRECTION | USE OF LUTid(X) AND CREATION OF LUTid(Z) | — | CREATION OF LUTb(Z) |
| v | FIRST CALIBRATION AND SECOND CALIBRATION USING PRINTING MEDIUM Z | PATTERN GENERATION | — | — | — |
| | | CORRECTION | USE OF LUTid(Z) | CREATION OF LUTa(Z) | — |
| vi | THIRD CALIBRATION | PATTERN GENERATION | — | USE OF LUTa(Z) | — |
| | | CORRECTION | — | UPDATING TO LUTa(Z)' | — |

FIG. 17B

| | LUTd | LUTa | LUTb |
|---|---|---|---|
| NORMAL IMAGE FORMATION BETWEEN i AND ii | — | LUTa(X) | LUTb(X) |
| NORMAL IMAGE FORMATION BETWEEN ii AND iii | — | LUTa(X)' | LUTb(X) |
| NORMAL IMAGE FORMATION BETWEEN iv AND v (USING PRINTING MEDIUM Z) | — | LUTa(X)'' | LUTb(Z) |
| NORMAL IMAGE FORMATION BETWEEN v AND vi (USING PRINTING MEDIUM Z) | — | LUTa(Z) | LUTb(Z) |
| NORMAL IMAGE FORMATION AT vi AND SUBSEQUENT TIMINGS (USING PRINTING MEDIUM Z) | — | LUTa(Z)' | LUTb(Z) |

IMAGE FORMING APPARATUS WHICH PERFORMS CALIBRATION FOR MAINTAINING IMAGE QUALITY

BACKGROUND OF THE INVENTION

1. Field of the Invention

The present invention relates to an image forming apparatus which performs calibration for maintaining the image quality.

2. Description of the Related Art

The image quality of an image forming apparatus varies depending on its use environment and use condition. The image quality also varies depending on the type of printing medium to be used. Therefore it is necessary to change the image conversion conditions and image forming conditions depending on the environment and use condition (Japanese Patent Laid-Open No. 07-261479). In some cases, image conversion conditions and image forming conditions need to be added according to the type of printing medium to be used (Japanese Patent Laid-Open No. 08-287217).

The invention in Japanese Patent Laid-Open No. 07-261479 assumes that a specific type of printing medium (to be referred to as the first printing medium) is used for calibration each time. If the first printing medium runs out, no calibration can be performed. Even in the invention of Japanese Patent Laid-Open No. 08-287217, performing calibration for an added arbitrary type of printing medium (to be referred to as the second printing medium) requires a printing medium of the same type to be prepared each time. This is because the calibration aims to maintain the gradation characteristic for the added second printing medium. If calibration is performed using the second printing medium of a type different from the first printing medium, for example, the amount of applied toner may become insufficient or exceed a permissible range designed for the image formation apparatus. This means that the image quality cannot be maintained. It would be convenient for the operator if calibration for the first printing medium can be performed using the second printing medium. For example, the use of an OHT (Overhead Transparency) sheet is designated for calibration for maintaining the gradation characteristic for the OHT sheet. However, making plain paper usable for calibration to maintain the gradation characteristic for the OHT sheet brings about significant advantages to the operator. It would be especially convenient if the second printing medium as another type can be additionally registered without using the first printing medium designated in advance by the manufacturer or the like.

SUMMARY OF THE INVENTION

It is an object of the present invention to solve at least one of the above problems or other problems. For example, it is an object of the present invention to calibrate the first printing medium by using the second type of printing medium. In particular, the present invention allows the addition of a second printing medium that can be used for calibration without using the first printing medium designated by the manufacturer or the like. Note that other problems will be understood throughout the specification.

The present invention is realized, for example, on an image forming apparatus. A first reading unit reads a pattern image formed on a first printing medium X to obtain a first luminance value. A first creation unit converts the first luminance value into a density value using first conversion information and creating an image processing condition based on the density value. A second reading unit reads a pattern image formed on an image carrier. A correction unit corrects the image processing condition based on a density value of the pattern image read by the second reading unit. A determination unit forms a pattern image on a second printing medium different from the first printing medium using the image processing condition corrected by the correction unit, and determines second conversion information for converting a luminance value into a density value for the second printing medium based on a second luminance value obtained by reading the pattern image on the second printing medium, the first luminance value, and the first conversion information.

Further features of the present invention will become apparent from the following description of exemplary embodiments (with reference to the attached drawings).

BRIEF DESCRIPTION OF THE DRAWINGS

FIGS. 9I and 9II are graphs for explaining the characteristic difference between printing media;

FIG. 11II is a graph showing the relationship between the read luminance value and the read density value;

FIG. 14 is a flowchart showing determination processing for target data used as a reference in the third calibration;

FIGS. 17A and 17B are tables showing how to use the three tables LUTid, LUTa, and LUTb.

DESCRIPTION OF THE EMBODIMENTS

Preferred embodiments of the present invention will be described below. Individual embodiments to be described below would help understand various concepts such as superordinate, intermediate, and subordinate concepts of the invention. The technical scope of the present invention is defined by the scope of the appended claims, and is not limited by the following individual embodiments.

[First Embodiment]

An embodiment applied to an electrophotographic color copying machine will be explained below. Note that the present invention is applicable to any image formation apparatus that needs calibration. The image formation scheme is not limited to electrophotography, and may be inkjet printing, electrostatic printing, and any other schemes. The present invention is applicable not only to an image formation apparatus for forming a multicolor image but also to an image formation apparatus for forming a single-color image. The image formation apparatus may be commercially available as, for example, a printing apparatus, printer, copying machine, multifunction peripheral, or facsimile apparatus. The printing medium is also called printing paper, printing material, paper, sheet, transfer material, or transfer paper. The printing medium can be made of paper, fiber, film, or resin.

Basic Hardware Configuration

Figure 1:
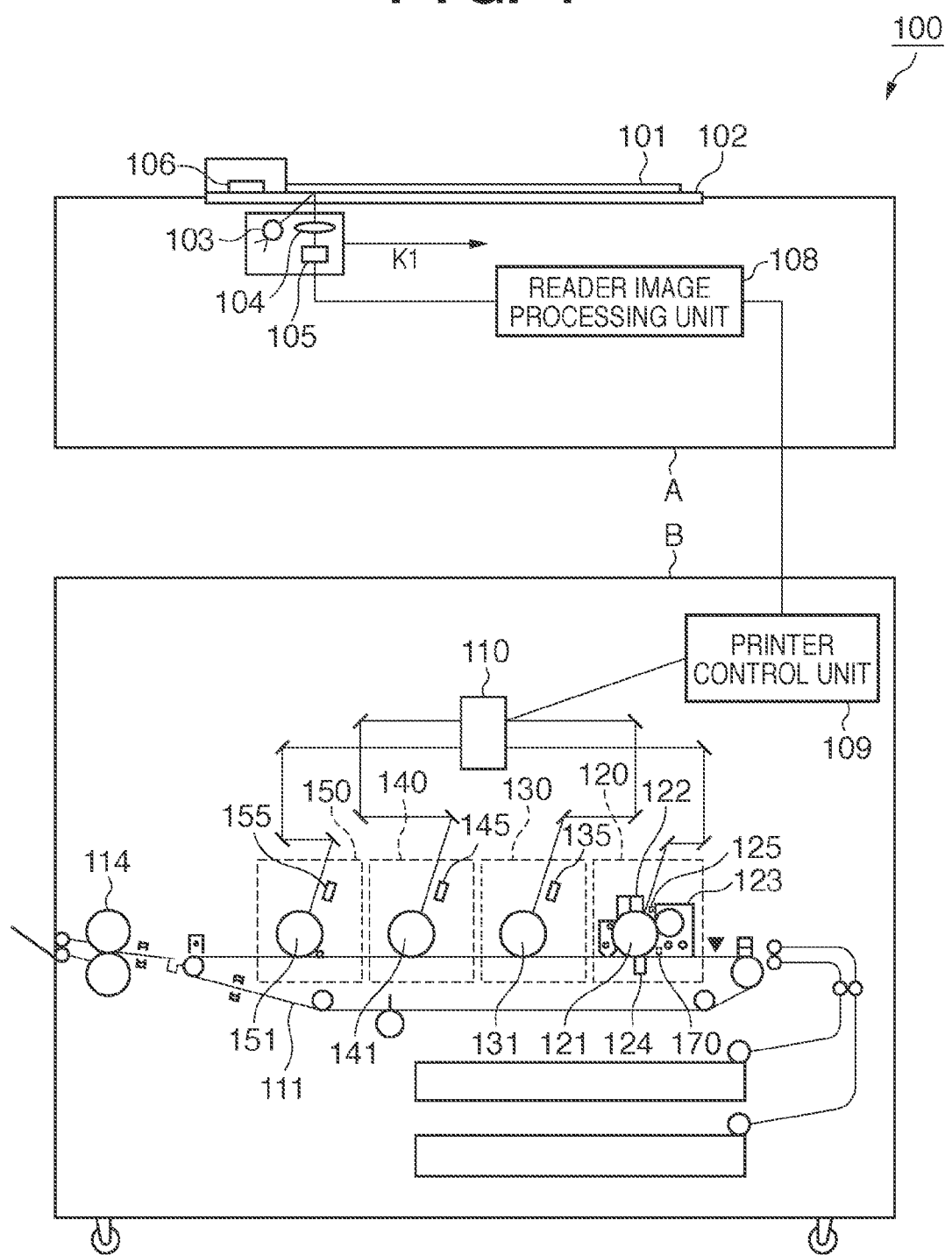
FIG. 1 is a view exemplifying the arrangement of a color copying machine.

A copying machine 100 shown in FIG. 1 includes a reader unit A which reads an image from a document, and a printer unit B which forms the image obtained by the reader unit A on a printing medium. The reader unit A is an example of an image reading means for reading a pattern image formed by an image forming means to create image data containing a luminance value. Before reading a document 101 set on an original platen glass 102, the reader unit A reads a reference white plate 106 to create a correction coefficient to be used in subsequent shading correction. The document 101 is irradiated with light from a light source 103, and the reflected light forms an image on a CCD sensor 105 via an optical system 104. A reading unit including the CCD sensor 105 moves in a direction indicated by an arrow K1 to convert the document into an electrical signal data string for each line. The CCD stands for a charge-coupled device. Relative motion between the document and reading unit may also be effected by movement of the document. A reader image processing unit 108 converts the electrical signal data string into an image signal.

Figure 2:
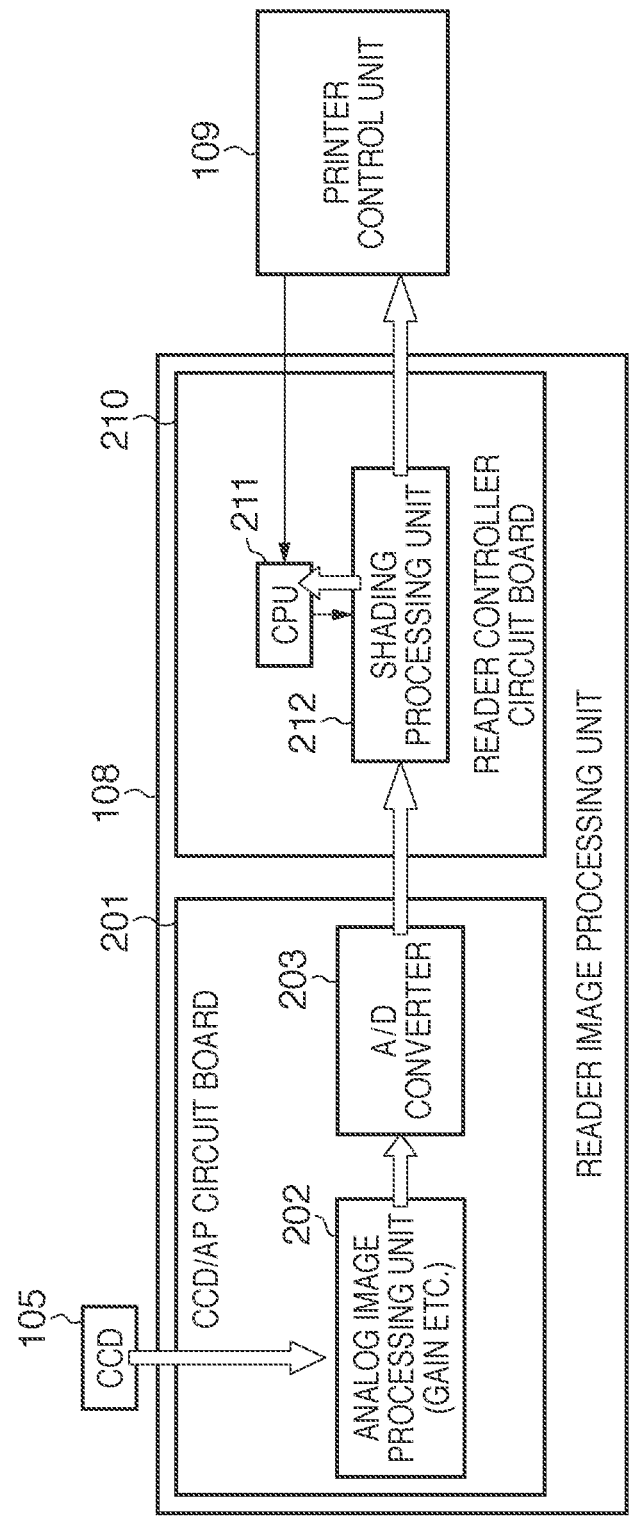
FIG. 2 is a block diagram showing a reader image processing unit.

An analog image processing unit 202 on a CCD/AP circuit board 201 adjusts the gain or the like for the image signal obtained by the CCD sensor 105 shown in FIG. 2. An A/D converter 203 then converts the image signal into a digital image signal, and outputs it to a controller circuit board 210 of the reader unit A. The AP stands for analogue processing. A shading processing unit 212 on the controller circuit board 210 of the reader unit A performs shading correction for the image signal under the control of a CPU 211, and outputs the resultant image signal to a printer control unit 109 of the printer unit B. At this time, the image signal contains R, G, and B luminance values.

The printer unit B will be described next. Referring to FIG. 1, the printer control unit 109 converts the image signal into a laser beam having undergone PWM (Pulse Width Modulation). The laser beam is deflected and scanned by a polygon scanner 110 to expose photosensitive drums 121, 131, 141, and 151 of image forming units 120, 130, 140, and 150. As a result, electrostatic latent images are formed. The image forming units 120, 130, 140, and 150 correspond to yellow (Y), magenta (M), cyan (C), and black (Bk), respectively. The image forming units 120, 130, 140, and 150 have almost the same arrangement, and only the image forming unit 120 for yellow will be explained. These image forming units are an example of image forming means for forming pattern images on a printing medium in accordance with preset contrast potentials. A primary charger 122 charges the surface of the photosensitive drum 121 to a predetermined potential. A developing unit 123 develops the electrostatic latent image on the photosensitive drum 121 to form a toner image. A transfer blade 124 discharges the photosensitive drum 121 from the back surface of a transfer belt 111 to transfer the toner image on the photosensitive drum 121 to a printing medium on the transfer belt 111. Then, a fixing unit 114 fixes the toner image onto the printing medium.

Note that the photosensitive drums 121, 131, 141, and 151 have surface electrometers 125, 135, 145, and 155, respectively, to measure their surface potentials. The surface electrometers 125, 135, 145, and 155 are used to adjust the contrast potential. A photosensor 170 is interposed between the development position and the transfer position. The photosensor 170 detects, for example, the density value of a developing material image (for example, the third pattern image to be described later) formed on the photosensitive drum 121. The photosensor 170 includes, for example, a light-emitting element (for example, LED) and light-receiving element (for example, photodiode) arranged to face the image carrier surface of the photosensitive drum 121. Light emitted by the light-emitting element is reflected by the third pattern image, and the reflected light enters the light-receiving element. The photosensor 170 converts the reflected light into an electrical signal (for example, about 0 to 5 V). An A/D conversion circuit 321 converts the electrical signal into a digital signal of 0 to 1023 levels. A density conversion circuit 322 converts the digital signal of 0 to 1023 levels into a density value, and outputs it to a CPU 301.

Figure 3:
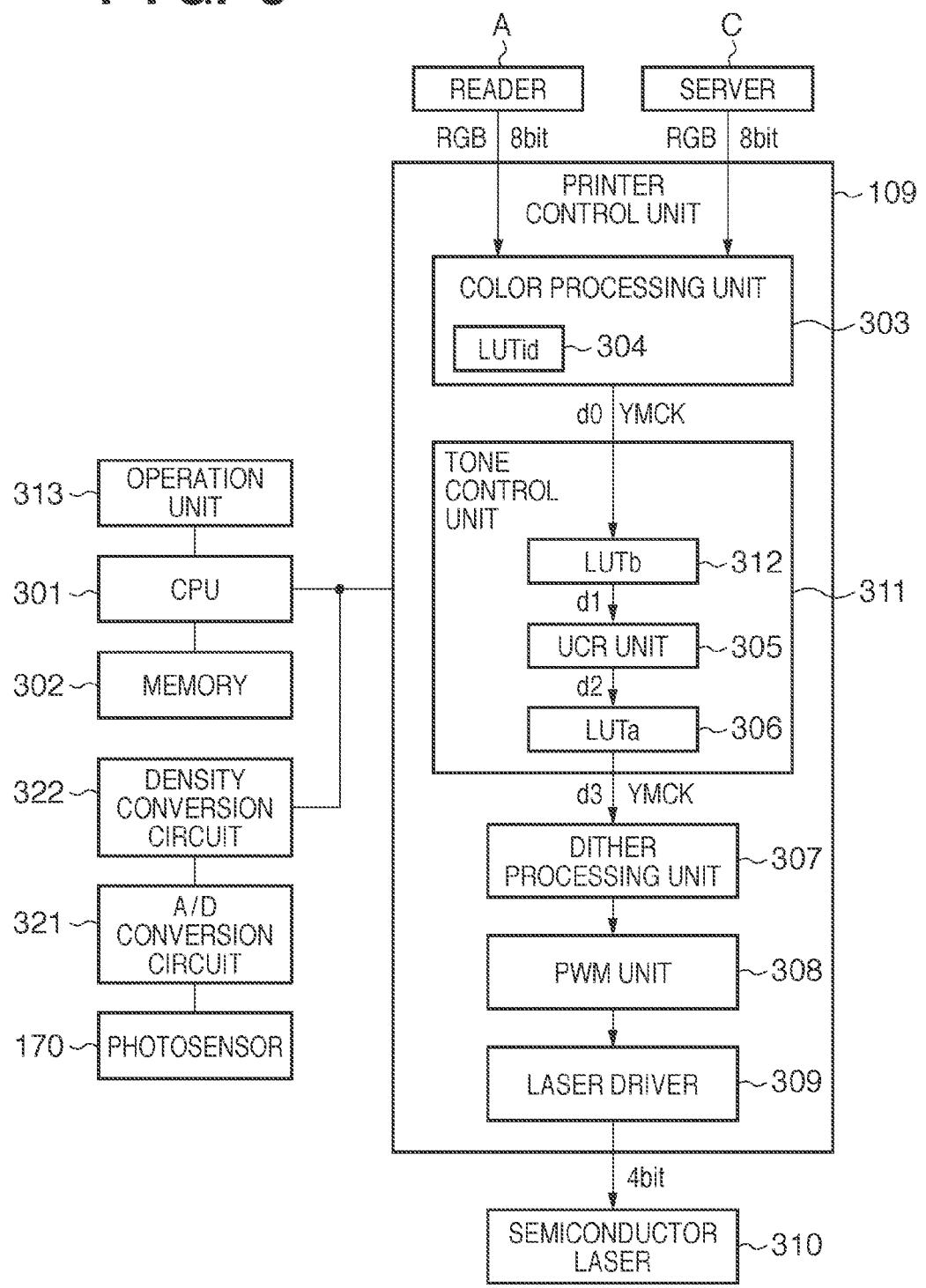
FIG. 3 is a block diagram showing a printer control unit 109.

The CPU 301 comprehensively controls the units of the printer control unit 109 shown in FIG. 3. The control unit may be formed not from the CPU 301 but from hardware such as an ASIC (Application Specific Integrated Circuit). The CPU 301 and ASIC or the like may share processes. In the following description, however, the CPU 301 performs various processes for descriptive convenience. A memory 302 includes a ROM and RAM, and stores control programs and various data. An image signal processed by the reader unit A, a print server C, or the like is input to a color processing unit 303 of the printer control unit 109. This image signal is a luminance signal indicating a luminance value, such as an RGB signal.

The color processing unit 303 is the first conversion means for converting a luminance value contained in image data into a density value using luminance-density conversion information LUTid for converting a luminance value into a density value in accordance with the type of printing medium. The LUT stands for a lookup table. The LUT need not always take the table form, and may be implemented by a function or program code. The color processing unit 303 applies image processing and color processing to an input image signal to obtain a desired output when the printer unit B has an ideal output characteristic. The number of tones of the input signal is given by eight bits. For higher accuracy, the color processing unit 303 expands 8 bits to 10 bits. The image signal output from the color processing unit 303 is a density signal YMCK indicating a density value d0.

After that, the image signal is sent to a dither processing unit 307 via a tone control unit 311. The dither processing unit 307 performs dither processing for the image signal to convert it into a 4-bit signal. An LUTid 304 is a luminance-density conversion table for converting a luminance value contained in the image signal sent from the reader unit A into a density value. The LUTid 304 is prepared for a specific type of printing medium (first printing medium) initially. However, in the embodiment, an LUTid 304 for the second printing medium is added by performing an operation of adding an arbitrary type of printing medium (second printing medium). The CPU 301 switches the LUTid 304 for each printing medium to be used.

The tone control unit 311 includes the LUTb 312, a UCR unit 305, and an LUTa 306. The UCR stands for under color removing. The LUTb 312 controls the graduation characteristic of the input density value d0, outputting a density value d1. The UCR unit 305 controls the graduation characteristic of the input density value d1, outputting a density value d2. The LUTa 306 controls the graduation characteristic of the input density value d2, outputting a density value d3. In a calibration step and printing medium adding step to be described later, the density value d0 is sometimes directly output as the density value d3 because the LUTa 306, LUTb 312, and the like are controlled not to operate. Hence, the tone control unit 311 is the second conversion means for converting a density value into an output density of the image forming means using the first image processing condition LUTa for adjusting the graduation characteristic in the image forming means, and the second image processing condition LUTb for adjusting the graduation characteristic in accordance with the type of printing medium. The tone control unit 311 corrects an image signal to adjust the printer unit B to ideal characteristics by using the LUTb 312, UCR unit 305, and LUTa 306. The ideal characteristics are characteristics capable of achieving image quality assumed in design in advance. The LUTa 306 and LUTb 312 are 10-bit conversion tables for correcting the density characteristic, and are particularly used to change the γ characteristic of the printer unit B.

The LUTb 312 is used to adjust the graduation characteristic for each printing medium. The LUTb 312 is prepared for each printing medium and switched in accordance with a printing medium designated by the operator.

The UCR unit 305 regulates the sum of output densities of the respective colors not to exceed a predetermined upper limit value. More specifically, the UCR unit 305 is a circuit which limits the sum of image signal levels by regulating the integrated value of image signals in each pixel. If the sum exceeds a predetermine value, the UCR unit 305 performs undercolor removing processing (UCR) to replace a predetermined amount of C, M, and Y signals with a K signal, thereby decreasing the sum of image signal levels. Assume that the upper limit value is 280%. Then, if a signal for Y=100%, M=100%, C=100%, and K=0% is input, the integrated value becomes 300%, exceeding the predetermined value. No color changes if K replaces a portion where Y, M, and C are formed by equal amounts. Thus, the UCR unit 305 decreases Y, M, and C by 10% each, and increases K by 10% instead. This results in Y=90%, M=90%, C=90%, and K=10%, and the integrated value can be maintained at 280% without changing the color. The purpose of regulating the sum of image signal levels is to regulate the amount of applied toner in image formation by the printer unit B. Optimizing the operation of the printer unit B in the embodiment is to prevent image quality degradation or the like caused by the amount of applied toner more than the predetermined amount. In the embodiment, the LUTb 312 arranged on the preceding stage of the UCR unit 305 adjusts the graduation characteristic. Even if the gradation characteristic is optimized for the second printing medium, the amount of applied toner does not exceed the predetermined amount.

The LUTa 306 is created for the first printing medium X to optimize the characteristics of the printer unit B. Note that the first printing medium X is a printing medium designed in advance by the manufacturer of the image formation apparatus to obtain a desired gradation. In general, the manufacturer of the image formation apparatus designates the printing medium X. The LUTa 306 in the present invention is commonly used for the second printing media as well. For the LUTa 306, the latest table is always used because it is a table used to correct variations of the engine characteristic of the printer unit B depending on the installation environment or a change over time. The LUTa 306 may be created using any type of printing medium.

The signal output from the tone control unit 311 undergoes dither processing by the dither processing unit 307 and pulse width modulation by a PWM unit 308. A laser driver 309 causes a semiconductor laser to emit light using the PWM-modulated signal. To do this, the dither processing unit 307 performs halftone processing to convert a 10-bit image signal into 4-bit data.

Control of Image Forming Conditions

A feature of the present invention is to optimize the printer characteristics by calibration using the second printing medium. Calibration using the first printing medium X set in advance will be explained first. The first printing medium X is, for example, a printing medium designated by the manufacturer of the image formation apparatus upon shipment from the factory or a printing medium designated at the time of maintenance by the maintenance engineer. In the embodiment, there are a first calibration mode in which the contrast potential is adjusted, and a second calibration mode in which the γ correction circuit (LUTa 306 and LUTb 312) of the tone control unit 311 for image data is adjusted. The third calibration mode using no printing medium will be described later.

I. First Calibration

Figure 4A:
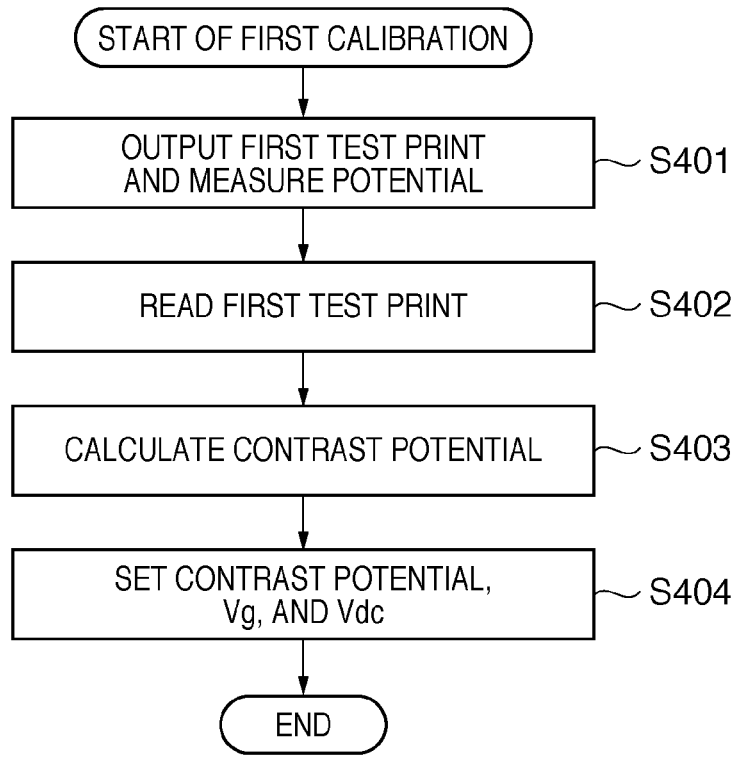
FIG. 4A is a flowchart showing contrast potential calculation processing in the first calibration.

FIG. 4A is a flowchart showing contrast potential calculation processing in the first calibration. In luminance value step S401, the CPU 301 outputs the first test print, and measures the surface potential of the photosensitive drum. For example, the CPU 301 creates image data (YMCK density value d0 (=d1)) of the first test pattern and outputs it to the tone control unit 311, forming the first test pattern as an image on the first printing medium X. The image data may be not created by the CPU 301 but stored in the ROM of the memory 302 in advance. The CPU 301 controls the tone control unit 311 so that the LUTb 312 does not act on the image data, in order to determine whether the LUTa 306 acts on an image formed on a printing medium. The first printing medium X bearing the first test pattern image will be called the first test print. As the contrast potential to be used to output the first test print, an initial value predicted to achieve the target density in the atmosphere environment (for example, absolute moisture content) at that time is set. The memory 302 is assumed to store contrast potential values corresponding to various atmosphere environments. The CPU 301 measures an absolute moisture content using a sensor (not shown), and determines a contrast potential corresponding to the measured absolute moisture content.

Figure 5A:
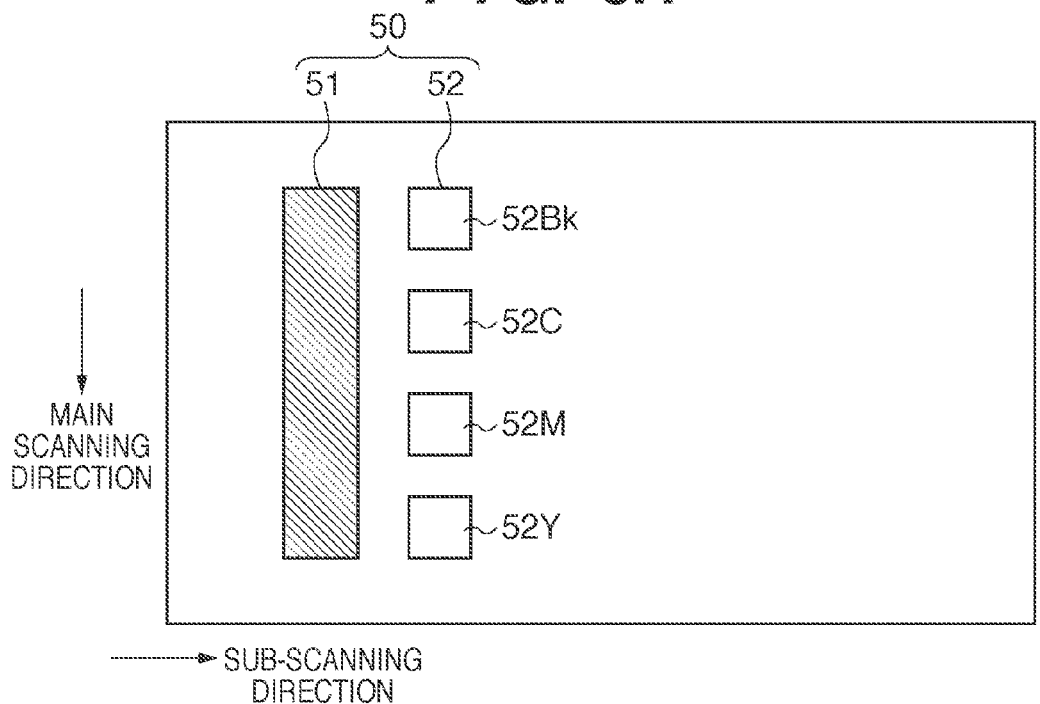
FIG. 5A is a view exemplifying the first test pattern used in the first calibration.

As shown in FIG. 5A, a first test pattern 50 is an example of the first pattern image including, for example, a stripe pattern 51 and patch pattern 52. The stripe pattern 51 is a strip-like pattern including halftone densities of Y, M, C, and Bk. The patch pattern 52 includes patch patterns 52Y, 52M, 52C, and 52Bk formed from maximum density patches (for example, 255-level density signals) for Y, M, C, and Bk. The surface electrometers 125, 135, 145, and 155 measure actual contrast potentials upon forming maximum density patches.

In step S402, the reader unit A reads the output first test print, and transfers the R, G, and B values to the CPU 301 of the printer control unit 109. The CPU 301 converts the R, G, and B values into optical densities using an LUTid(X) prepared in advance for the first printing medium X. The LUTid (X) is a luminance-density conversion table set in accordance with the relationship between the density value on the first printing medium X and the read luminance value in the reader unit A. An LUTid(Z) (to be described later) which makes the second printing medium Z usable for calibration is created by changing the LUTid(X).

Figure 6:
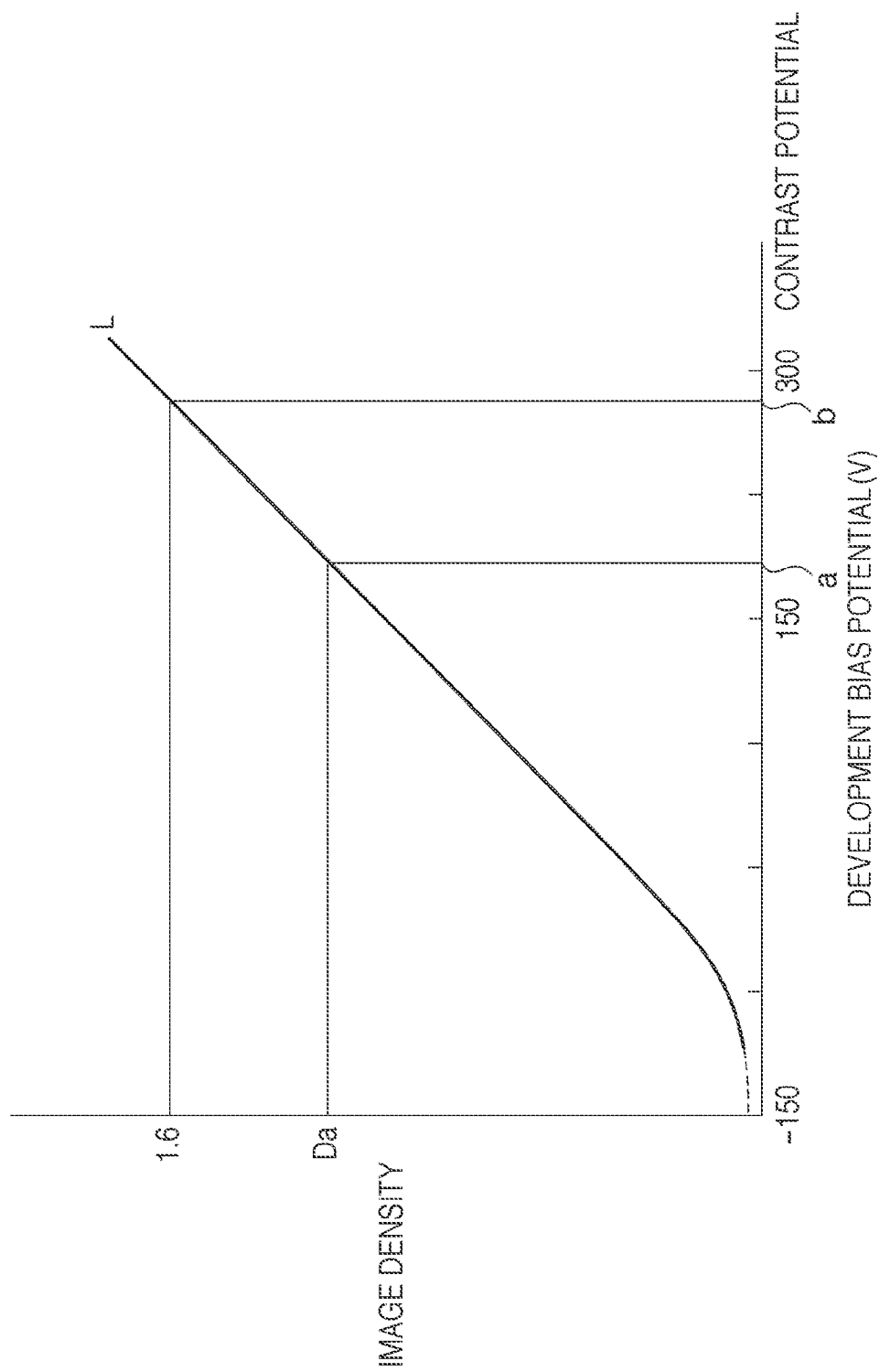
FIG. 6 is a graph showing the relationship between the contrast potential and the image density value.

In step S403, the CPU 301 calculates a contrast potential b corresponding to the target maximum density. Referring to FIG. 6, the abscissa indicates the development bias potential, and the ordinate indicates the image density. The contrast potential is the difference between the development bias potential and the surface potential of the photosensitive drum when a semiconductor laser 310 of each color emits light at the maximum level after the primary charge of the photosensitive drum. Assume that the maximum density obtained from the first test print formed using a contrast potential a is Da. In this case, the image density is linear with respect to the contrast potential near the maximum density (density of 0.8 to 2.0), as indicated by a solid line L. The solid line L is determined by the contrast potential a and maximum density Da. In the embodiment, for example, the target maximum density is set to 1.6. The CPU 301 calculates a contrast potential b corresponding to the target maximum density based on the solid line L. The memory 302 is assumed to store in advance a table or function corresponding to the solid line L. The contrast potential b is calculated using, for example, equation (1):

$$b = (a + ka) \times 1.6/Da \tag{1}$$

where ka is a correction coefficient determined by the type of developing method. In step S404, the CPU 301 determines and sets a grid potential Vg and development bias potential Vds based on the contrast potential b.

Figure 7:
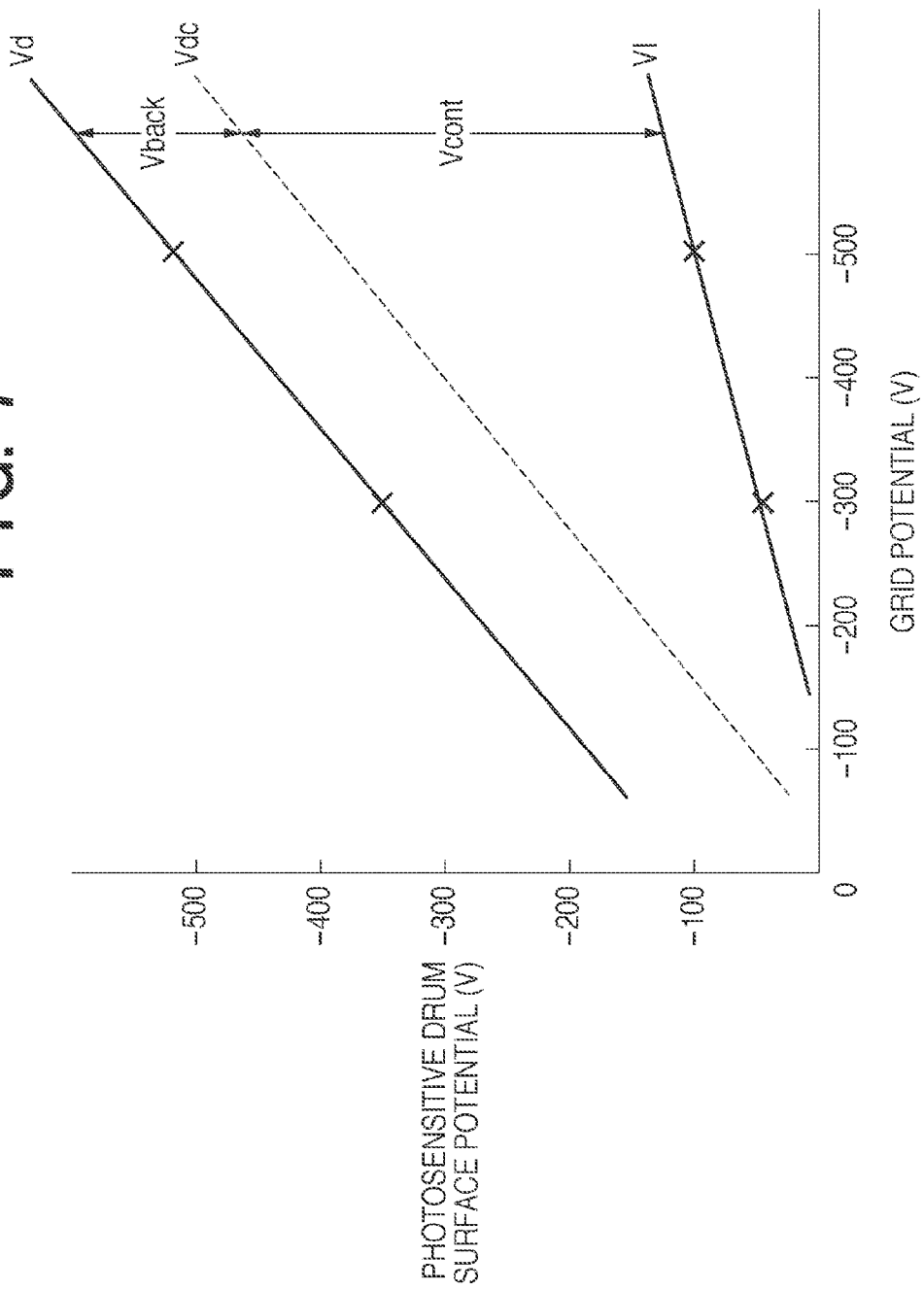
FIG. 7 is a graph showing the relationship between the grid potential Vg and the photosensitive drum surface potential.

Referring to FIG. 7, the CPU 301 sets the grid potential Vg to −300 V, performs scanning while minimizing the emission pulse level of the semiconductor laser 310 of each color, and causes each of the surface electrometers 125, 135, 145, and 155 to measure a surface potential Vd. In addition, the CPU 301 sets the grid potential Vg to −300 V, and causes each of the surface electrometers 125, 135, 145, and 155 to measure a surface potential Vl at the maximum emission pulse level of the semiconductor laser 310 for each color. Similarly, the CPU 301 sets the grid potential Vg to −700 V, and measures the surface potentials Vd and Vl. The CPU 301 can determine the relationship between the grid potential and the photosensitive drum surface potential shown in FIG. 7 by interpolating or extrapolating data at the −300 V and data at −700 V. Control to obtain potential data is called potential measurement control.

A contrast potential Vcont is determined as the difference voltage between a development bias Vdc and the surface potential Vl. A higher maximum density can be ensured for a higher contrast potential Vcont. The CPU 301 determines a grid potential Vg corresponding to the determined contrast potential b based on the relationship shown in FIG. 7. The CPU 301 determines a corresponding surface potential Vd based on the determined grid potential Vg and the relationship shown in FIG. 7. The CPU 301 also determines the development bias Vdc by subtracting Vback (for example, 150 V) from the surface potential Vd. The potential Vback is determined to prevent adhesion of fog toner to an image.

II. Second Calibration

As is well known, an image formation apparatus such as a copying machine forms a copy (output image) by reading a document image. That is, the density (gradation characteristic) of a document image and the density (gradation characteristic) of an output image need to match each other. In processes performed by the copying machine, the document image is converted into a luminance signal by the reader unit, and the luminance signal is converted into a corresponding density signal. The density signal is further converted into a laser output signal corresponding to the amount of applied toner. A laser beam corresponding to the laser output signal irradiates the image carrier, forming an electrostatic latent image. The electrostatic latent image is developed with toner, forming a toner image. The toner image is transferred to a printing medium, and fixed by the fixing unit, thereby forming an output image.

Figure 8:
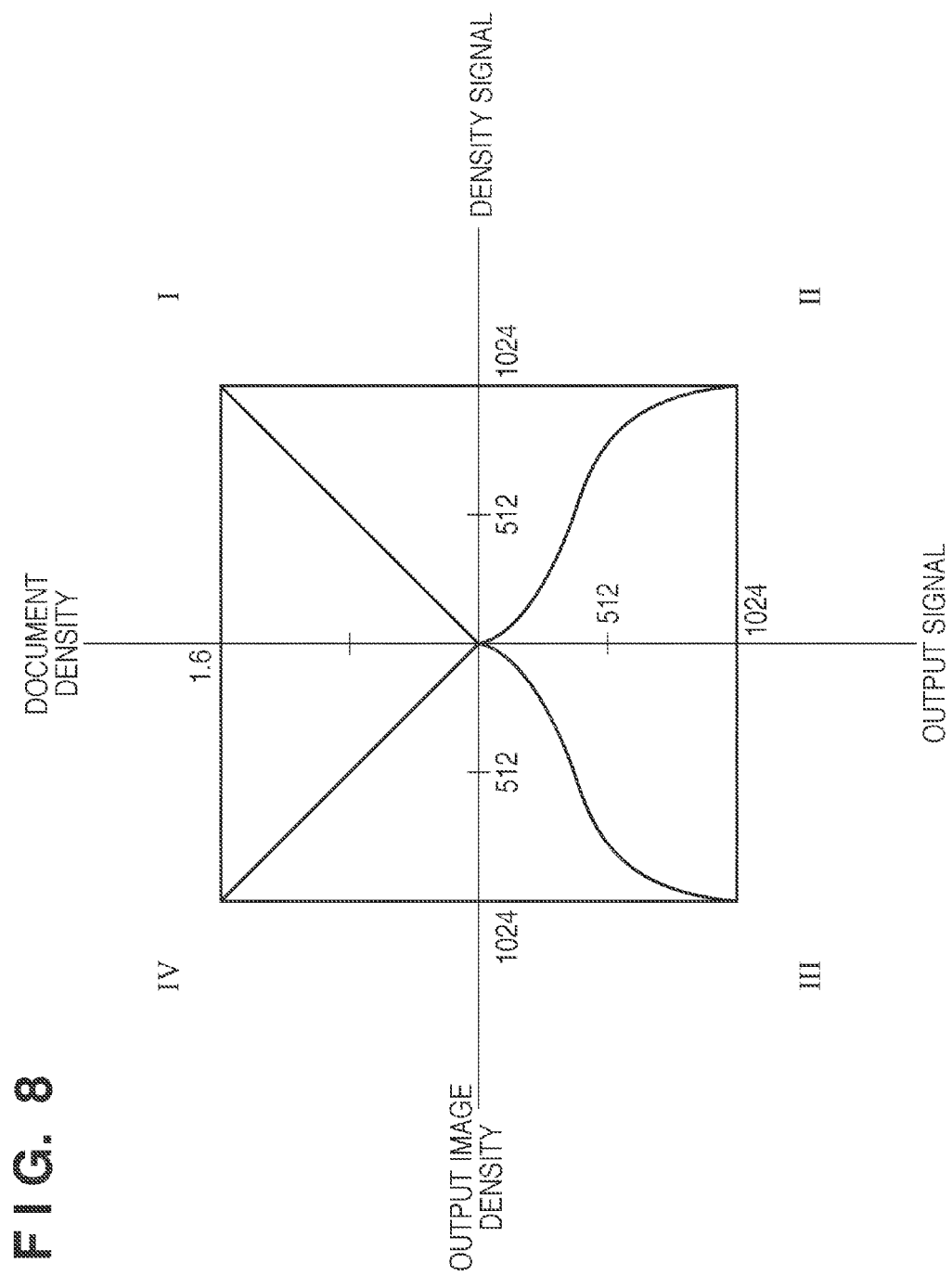
FIG. 8 is a characteristic conversion chart showing characteristics necessary to reproduce the density of a document image.

FIG. 8 shows the relationship between signals in a series of copy processes until an output image is formed from a document. The region I represents the characteristic of the reader unit A which converts a document density into a density signal. Note that the document density is expressed as an optical density obtained by reading a document using an optical densitometer. The number of tones of the density signal is 1,024. The region II represents the characteristic of the tone control unit 311 (LUTa 306 and LUTb 312) for converting a density signal into a laser output signal. The number of tones of the laser output signal is also 1,024. An LUTa and LUTb(X) are set for the first printing medium X. The LUTb(X) has a linear characteristic for the first printing medium X, so only the LUTa substantially operates in the tone control unit 311. The LUTb(X) is merely a table which returns an input value directly as an output value, and may be omitted. The region III represents the characteristic of the printer unit B which converts a laser output signal into an output density. The output image density is sometimes called a printing density. The number of tones of the output image density is 1,024. The region IV represents the relationship between the document density and the printing density. This relationship represents the whole gradation characteristic of the copying machine 100 according to the embodiment.

In the copying machine 100, to obtain a linear gradation characteristic in the region IV, the tone control unit 311 in the region II corrects the distortion of the printing characteristic of the printer unit B in the region III. The LUTa can be easily created by simply replacing the input with the output in the characteristic in the region III obtained upon outputting a test print without operating the tone control unit 311. The pattern image on the test print includes a plurality of patches of different tones. The output signal used to form each patch is already known, as a matter of course, and the density of each patch is read as a luminance value by the reader unit A and converted into a density signal based on the LUTid. From them, the relationship between different output signals given as inputs and density signals (density values) serving as corresponding outputs is obtained. Hence, reversing the relationship between the input and the output provides an output signal which should be output in correspondence with a density signal given as an input. That is, the LUTa indicates the relationship between the density signal and the output signal. In the embodiment, the number of tones of the output is 256 (8 bits), but that of tones in the tone control unit 311 is 1,024 because the tone control unit 311 processes a 10-bit digital signal.

Figure 4B:
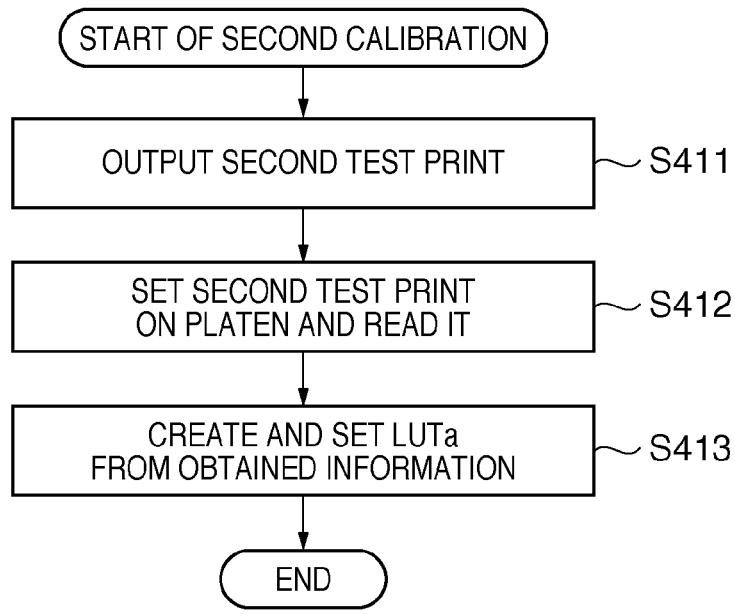
FIG. 4B is a flowchart showing the second calibration.

FIG. 4B is a flowchart showing the second calibration. The CPU 301 performs the second calibration as one of a plurality of types of calibrations. The second calibration is generally performed after the end of the first calibration.

In step S411, the CPU 301 outputs the second test print. For example, the CPU 301 creates image data (YMCK density value d0 (=d1)) of the second test pattern and outputs it to the tone control unit 311, forming the second test pattern as an image on the first printing medium X. The image data may not be created by the CPU 301 but stored in the ROM of the memory 302 in advance. The first printing medium X bearing the second test pattern image serves as the second test print. At this time, the CPU 301 performs image formation without operating the LUTa and LUTb of the tone control unit 311. The density signals Y, M, C, and K output from the UCR unit 305 are input to the dither processing unit 307 while detouring around the LUTa 306.

Figure 5B:
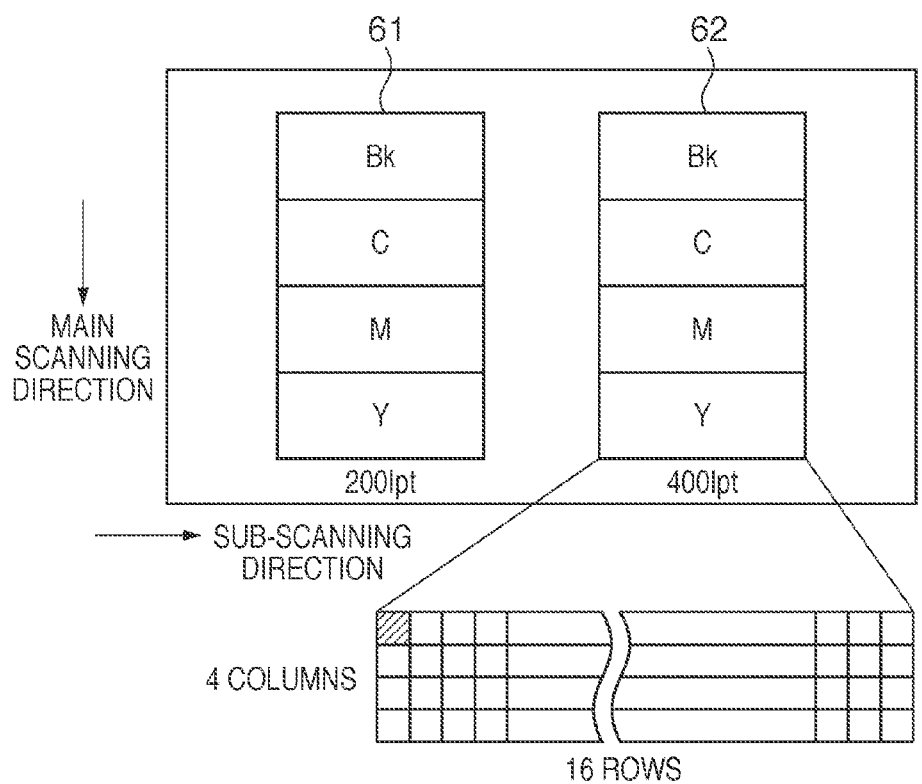
FIG. 5B is a view exemplifying the first test pattern used in the second calibration.

In the second test print, for example, the second test pattern (patch groups 61 and 62) having 4 columns×16 rows (that is, 64 tones) in gradation for each of Y, M, C, and Bk is formed, as shown in FIG. 5B. The second test pattern is an example of the second pattern image. For example, low-density regions out of a total of 256 tones can be assigned to the 64-tone test pattern. This allows to appropriately adjust the gradation characteristic at a highlight portion. Note that a second test pattern for low resolution (160 to 180 lpi) and that for high resolution (250 to 300 lpi) may be prepared separately. In FIG. 5B, the former is the patch group 61, and the latter is the patch group 62. Note that lpi stands for lines per inch. To form an image of each resolution, the dither processing unit 307 performs dither processing having parameters corresponding to the resolution. Note that it suffices to create a halftone image at a resolution of about 160 to 180 lpi and a line image such as a character at a resolution of about 250 to 300 lpi. Test patterns of the same tone level are output at the two resolutions. If the gradation characteristic largely changes due to the difference in resolution, the tone level can be set in accordance with the resolution. If the printer unit B has a capability of forming an image at three or more resolutions, the test print for the second calibration may be divided into a plurality of pages.

In step S412, the reader unit A reads an image from the second test pattern. R, G, and B luminance values output from the second test pattern are input to the color processing unit 303. The color processing unit 303 converts the R, G, and B luminance values into density values using the LUTid(X). The LUTid(X) is used because the first printing medium X is used.

In step S413, the CPU 301 associates each density value with a laser output level used to create the second test pattern and a test pattern (tone patch) creation position, thereby creating a table indicating the relationship between the laser output level and the density. The CPU 301 writes the created table in the memory 302. At this time, the CPU 301 can determine the characteristics of the printer unit B in the region III shown in FIG. 8. By replacing the input with the output in the characteristic, the LUTa of the printer unit B is determined and set in the tone control unit 311. In some cases, data is lacking to determine the LUTa by calculation. This is because gradation patches of only 64 tones are formed though those of 256 tones are originally required. The CPU 301 creates any lacking data by interpolation processing. The second calibration can implement a linear gradation characteristic with respect to the target density. When determining the LUTb(X), the LUTa is set in the tone control unit 311 to effectively operate, and then steps S411 to S413 are performed. That is, the LUTb(X) can be determined by the same method as that for the LUTa.

The first calibration and second calibration are performed sequentially in the embodiment, but only either one may be performed individually. In the embodiment, calibration can be performed to effectively correct variations of the image density, image reproducibility, or tone reproducibility that may occur in a short or long term. The image quality can therefore be maintained.

Operation (First Adding Operation) of Adding Arbitrary Type of Printing Medium (Second Printing Medium)

A feature of the present invention is to add the second printing medium Z without using the first printing medium X designated in advance by the manufacturer or the like. Needless to say, the second printing medium Z may still be added using the first printing medium X designated in advance by the manufacturer or the like. This is beneficial because the second printing medium Z can be added even if the user or operator cannot access the first printing medium X. An operation to add the second printing medium Z using the first printing medium X will be explained first. Then, an operation to add the second printing medium Z without using the first printing medium X will be explained.

In the first place, the second printing medium Z is added because it is convenient for the user or operator if the first calibration and second calibration can be performed using the second printing medium Z different from the first printing medium X. A feature of the embodiment is to finally optimize the printer characteristics by performing calibration using the second printing medium Z. The CPU 301 performs the second calibration using the second printing medium Z, and controls the image forming means to form the second pattern image on the second printing medium Z. Further, the CPU 301 obtains the relationship between the optical density and the output density from the second pattern image formed on the second printing medium Z, and creates the second image processing condition LUTb for the second printing medium Z based on the obtained relationship.

In general, using the second printing medium Z for calibration which assumes using the first printing medium X causes a problem in the corrected printer output characteristic because of the following reason. For the first printing medium X, the amount of applied toner is known, and calibration is designed not to generate defects in an image. By performing calibration using the first printing medium X, the gradation characteristic can be adjusted to a desired characteristic. However, for the second printing medium Z, the relationship between the density and the amount of applied toner is unknown. If the second printing medium Z is used in calibration which assumes using the first printing medium X, the amount of applied toner may exceed an amount assumed in the design. In this case, problems may arise in transfer or fixing, resulting in image quality degradation.

FIGS. 9I and 9II exemplify the second printing medium Z whose output density lowers at the same amount of applied toner as that of the first printing medium X. Assume that the image forming conditions are set so that both the first printing medium X and second printing medium Z exhibit an output density characteristic shown in FIG. 9I for a certain primary color. FIG. 9II shows the amount of applied toner on the printing medium with respect to the density signal. That is, the amount of applied toner on the second printing medium Z is larger than that on the first printing medium X. When a secondary color, tertiary color, and the like are output in this state, toner in an amount more than assumed exists on the second printing medium Z, generating a fixing error.

In the embodiment, the sum of signal levels of image signals is regulated immediately before the LUTa to relax the excess amount of applied toner. To implement this, identical pattern images (image patterns) are formed on the first printing medium X and second printing medium Z using the same image signal. The same image signal is used to equalize the amounts of applied toner on the first printing medium X and second printing medium Z. The reader unit A reads images from the first printing medium X and second printing medium Z, and determines their luminance values. The CPU 301 calculates the luminance difference between the luminance values, and corrects the difference using the LUTid. For example, the CPU 301 adds the difference to the LUTid(X) for the first printing medium X, creating the LUTid(Z) for the second printing medium Z. When performing calibration using the second printing medium Z, the LUTid(Z) is set in the color processing unit to create an LUTa which implements the same gradation as that obtained by performing calibration using the first printing medium X.

Figure 10:
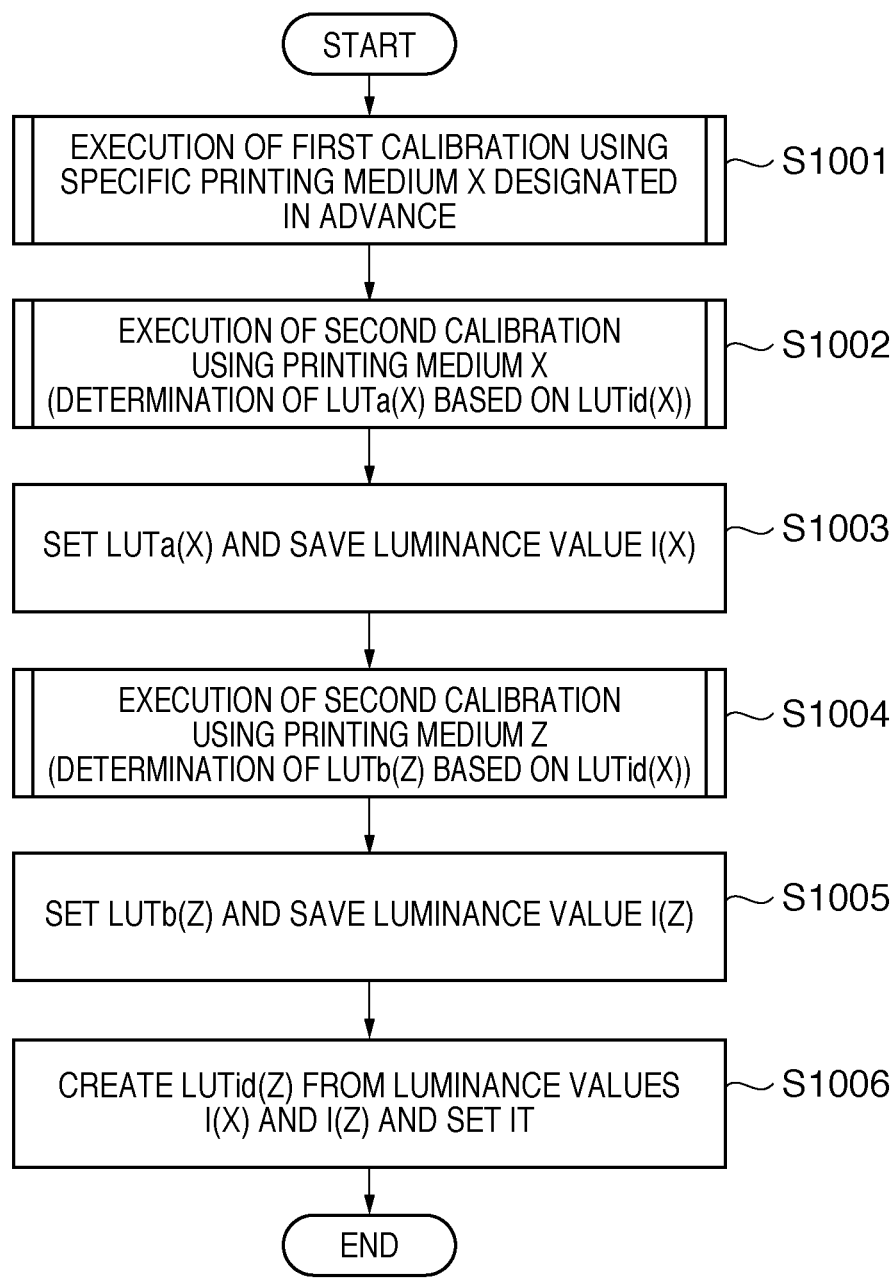
FIG. 10 is a flowchart showing a printing medium adding operation.

Referring to FIG. 10, when the user designates additional registration of a printing medium for calibration by a button of an operation unit 313 on the copying machine 100, the CPU 301 activates the adding operation. At this point of time, the LUTid(X) has been set in the color processing unit 303. The LUTb(X) does not act on an image signal because it has a property of directly outputting an input, like a unit matrix.

In step S1001, the CPU 301 performs the aforementioned first calibration (steps S401 to S404) using the first printing medium X designated in advance.

In step S1002, the CPU 301 performs the second calibration (steps S411 to S413) using the first printing medium X. That is, the first calibration and second calibration are performed sequentially. An LUTa is thus created. The reader unit A reads an image pattern formed on the first printing medium X, generates the read luminance value I(X), and transfers it to the CPU 301 of the printer control unit 109. The luminance value I(X) corresponds to the first luminance value obtained from an image formed on the first printing medium X.

In step S1003, the CPU 301 sets the LUTa(X) in the tone control unit 311, and saves the luminance value I(X) in the memory 302. By setting the LUTa(X) in the tone control unit 311, the characteristics of the printer unit B are corrected to appropriate ones assumed upon shipment from the factory.

In step S1004, the CPU 301 performs the second calibration (steps S411 to S413) using the second printing medium Z to be added. At this time, the LUTid(X) is set in the color processing unit 303, and the LUTa(X) set in step S1003 is used for the LUTa 306. Since the second calibration is performed using the second printing medium Z, the LUT created by the CPU 301 is the LUTb(Z). The reader unit A reads an image pattern formed on the second printing medium Z, generates the read luminance value I(Z), and transfers it to the CPU 301 of the printer control unit 109. The luminance value I(Z) corresponds to the second luminance value obtained from an image formed on the second printing medium Z.

In step S1005, the CPU 301 sets the LUTb(Z) in the tone control unit 311, and saves the luminance value I(Z) in the memory 302. By setting the LUTb(Z) in the tone control unit 311, the graduation characteristic becomes proper in the use of the second printing medium Z.

In step S1006, the CPU 301 applies the following method to the read luminance values I(X) and I(Z), creating an LUTid (Z) to be applied when performing calculation using the second printing medium Z. Further, the CPU 301 stores the LUTid(Z) in the memory 302 together with the LUTb(Z) in association with identification information of the second printing medium Z. When the second printing medium Z is designated via the operation unit 313, the CPU 301 reads out the corresponding LUTid(Z) and LUTb(Z) from the memory 302, and sets them in the color processing unit 303 and tone control unit 311, respectively. Note that the LUTid(Z) corresponds to the second conversion information for converting a luminance value into a density value for the second printing medium Z. A detailed creation method of the LUTid(Z) is as follows.

Figure 11:
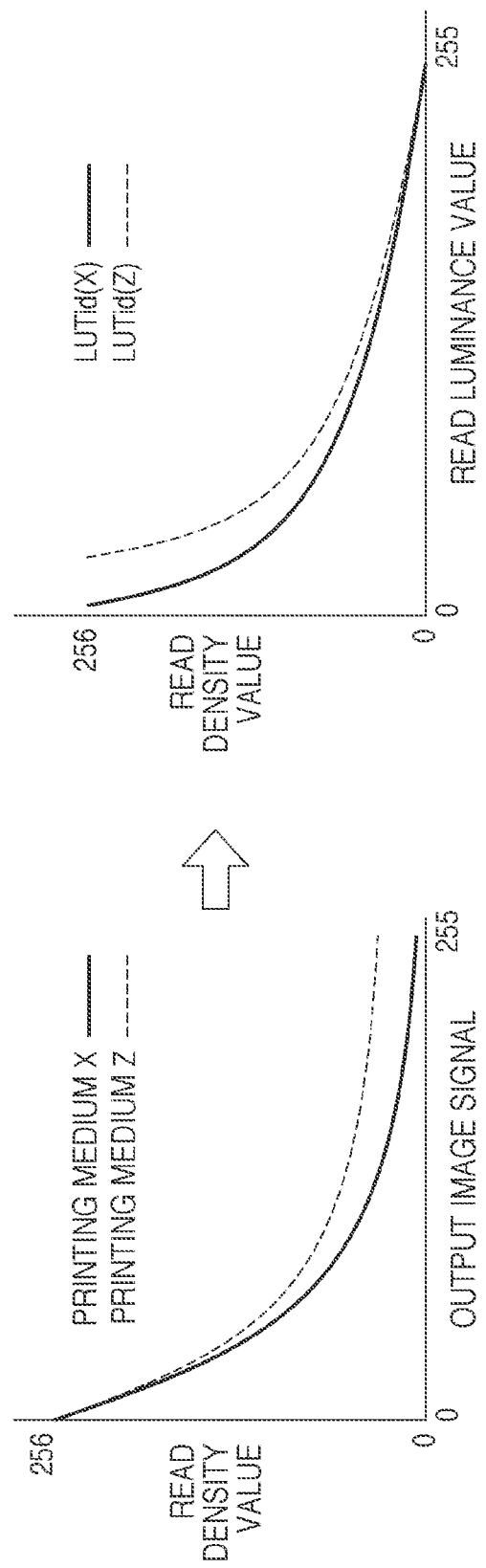
FIG. 11I is a graph showing the relationship between the output image signal and the read luminance value for each of the first printing medium X and second printing medium Z.

Referring to FIGS. 11I and 11II, FIG. 11I shows the relationship between the output image signal and the read luminance value for each of the first printing medium X and second printing medium Z. FIG. 11II shows the relationship between the read luminance value and the read density value. Note that the density value of the second printing medium Z is converted into that on the first printing medium X.

The read luminance value I(X) for the first printing medium X and the read luminance value I(Z) for the second printing medium Z are luminance values read from images formed on the first printing medium X and second printing medium Z using the same image signal (=the same amount of applied toner). Based on the luminance values I(X) and I(Z), the CPU 301 calculates the luminance difference between the first printing medium X and the second printing medium Z necessary to achieve the same amount of applied toner.

The CPU 301 adds the luminance difference to the LUTid (X), creating an LUTid(Z) for the second printing medium Z.

Figure 12:
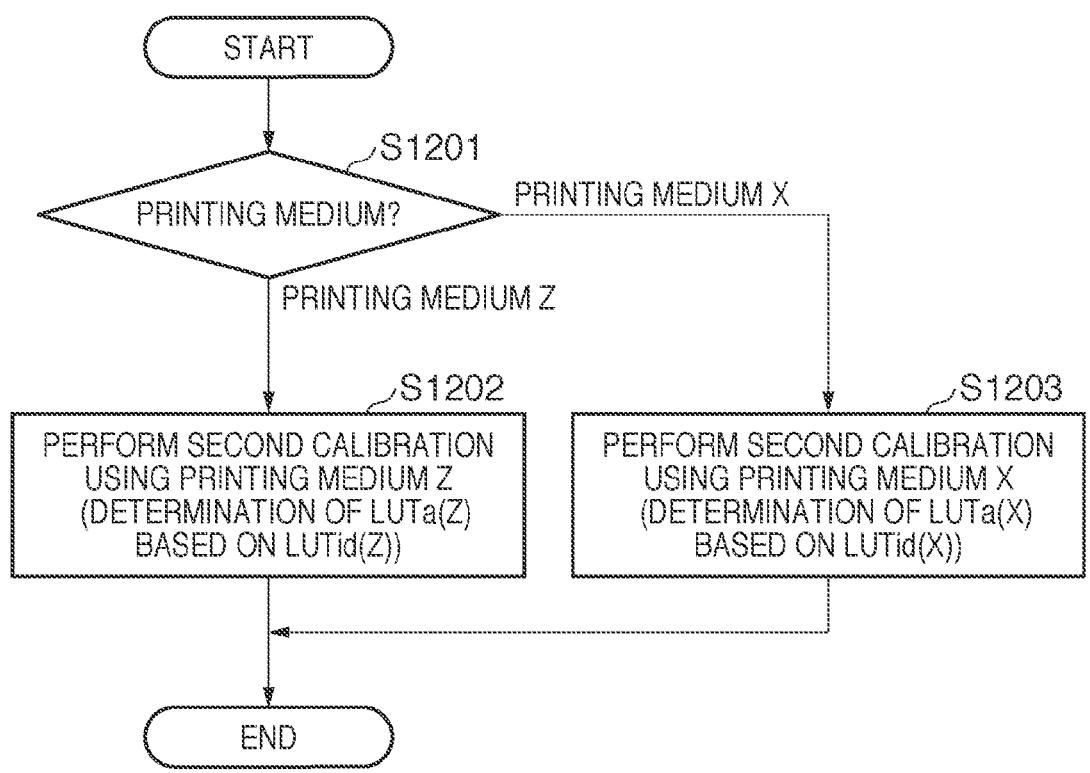
FIG. 12 is a flowchart showing the second calibration using the first printing medium X or second printing medium Z.

Thereafter, calibration is activated when the environment changes, a predetermined number of images or more are formed, or the operator designates execution of calibration via the operation unit. It is generally estimated that the gradation characteristic in the image forming means has varied when such an event occurs. The CPU 301 activates the second calibration at the timing when it is estimated that the gradation characteristic in the image forming means has varied. Processing in this case will be explained with reference to FIG. 12.

In step S1201, the CPU 301 accepts, via the operation unit 313, designation of a type of printing medium to be used for the second calibration, and determines the designated type of printing medium. If the second printing medium Z is designated, the process advances to step S1202.

In step S1202, the CPU 301 reads out, from the memory 302, the LUTid(Z) corresponding to the designated second printing medium Z, and sets it in the color processing unit 303. The CPU 301 reads out, from the memory 302, the LUTb(Z) corresponding to the second printing medium Z, and sets it in the tone control unit 311. Then, the CPU 301 performs the first calibration (steps S401 to S404) and the second calibration (steps S411 to S413). The second calibration updates especially the LUTa(Z). To the contrary, if the first printing medium X is designated, the process advances to step S1203.

In step S1203, the CPU 301 sets the LUTid(X) corresponding to the designated first printing medium X in the color processing unit 303. Further, the CPU 301 reads out, from the memory 302, the LUTb(X) corresponding to the first printing medium X, and sets it in the tone control unit 311. Then, the CPU 301 performs the first calibration (steps S401 to S404) and the second calibration (steps S411 to S413). The second calibration updates especially the LUTa(X). Note that the CPU 301 creates the LUTa 306 but no LUTb 312. This is because the LUTa 306 is a table used to restore characteristics which vary depending on the installation environment and use state, whereas the LUTb 312 is independent of the installation environment and use state. In other words, the LUTb 312 is a table which changes in accordance with the type of printing medium. Once the LUTb 312 is registered, the registered LUTb 312 is continuously used.

According to the embodiment, the second conversion information LUTid(Z) for the second printing medium Z is created from the characteristic (luminance value I(X)) of the first printing medium X, the characteristic (luminance value I(Z)) of the second printing medium Z, and the first conversion information LUTid(X) for the first printing medium X. This enables calibration to be performed using the second printing medium Z. The amount of applied toner can be equalized between the first printing medium X and the second printing medium Z by forming images on them using the same image signal. Because of the same amount of applied toner, the difference between the luminance values I(X) and I(Z) is equivalent to that between the LUTid(X) and LUTid(Z). By adding the difference between the luminance values I(X) and I(Z) to the LUTid(X), the LUTid(Z) can be obtained relatively easily.

According to the embodiment, the output characteristic of the printer unit B for a single color can be adjusted to a desired characteristic at high precision. The embodiment can improve color reproducibility when the printer control unit 109, an external controller, or the like performs color management using an ICC profile. Note that ICC stands for International Color Consortium.

In the embodiment, image formation and reading on the second printing medium Z are done after image formation and reading on the first printing medium X in the printing medium adding operation. However, it is also possible to form images on the first printing medium X and second printing medium Z and then read them from the first printing medium X and second printing medium Z. The order of the first printing medium X and second printing medium Z is arbitrary.

By performing the above-described addition processing, a plurality of second printing media Z1 to Zn (n is the number of second printing media Z registered for calibration) can be registered in the printer control unit 109. For example, to further add another printing medium Z2 using a printing medium Z1 which has already been added, it suffices to perform the sequence described with reference to FIG. 10 by replacing the first printing medium X with the printing medium Z1 and the second printing medium Z with the printing medium Z2. Similarly, Z3 to Zn can be added. Note that the created LUTid(Zi) and LUTb(Zi) are stored in the memory 302 in association with identification information i indicating the type of printing medium. The CPU 301 switches the LUTid and LUTb in accordance with the type of printing medium to be actually used when performing calibration. Even if the operator does not have the first printing medium X designated by the manufacturer, he can add a printing medium for calibration.

Re-Creation (Updating) of LUTb

In the above-described embodiment, only the LUTa is updated in every calibration. However, the LUTb may also be updated. The engine state of the printer unit B is generally adjusted to an ideal state by updating the LUTa. The LUTb basically needs not be updated. However, the calibration result varies to a certain degree. Strictly speaking, the state of the printing medium changes depending on the production lot or use environment. It is therefore good to create the LUTb again to perform calibration at higher precision. The re-created LUTb can cancel an error arising from the LUTa. That is, an error contained in the LUTb can be suppressed to one generated when calibration was performed once.

Figure 13A:
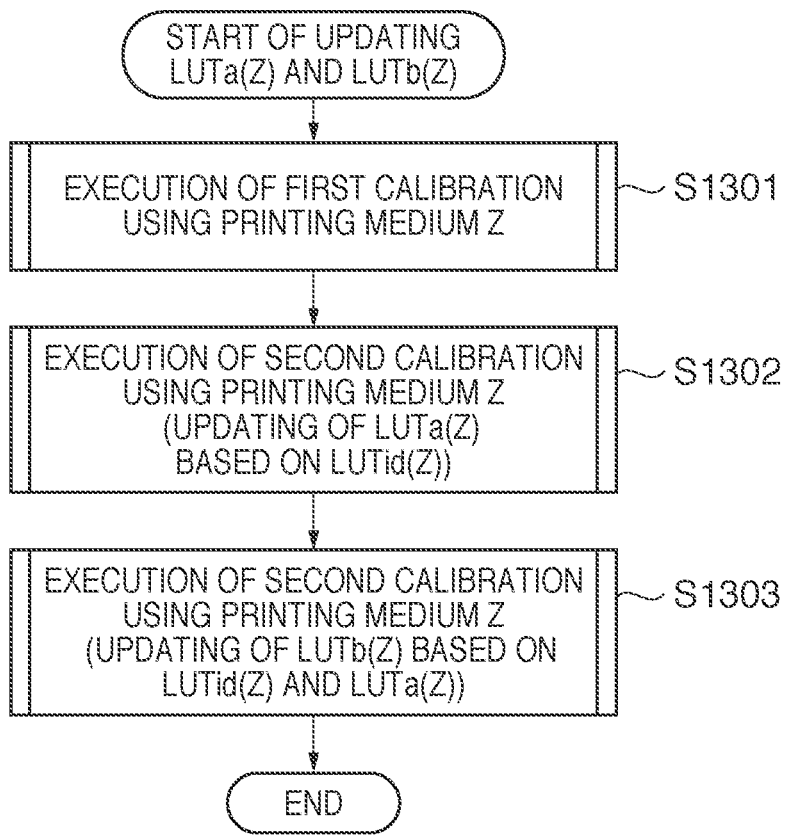
FIG. 13A is a flowchart showing update processing for the LUTa and LUTb.

LUTb re-creation processing will be explained with reference to FIG. 13A.

In step S1301, the CPU 301 performs the first calibration.

In step S1302, the CPU 301 sets the LUTid(Z) in the color processing unit 303, and performs the second calibration using the second printing medium Z, determining an LUTa (Z).

In step S1303, the CPU 301 sets the LUTid(Z) in the color processing unit 303, sets the LUTa(Z) in the tone control unit 311, and performs the second calibration using the second printing medium Z, determining an LUTb(Z).

This embodiment increases the work time and labor by about 1.5 times, but improves the calibration accuracy because the second calibration is done twice.

Figure 13B:
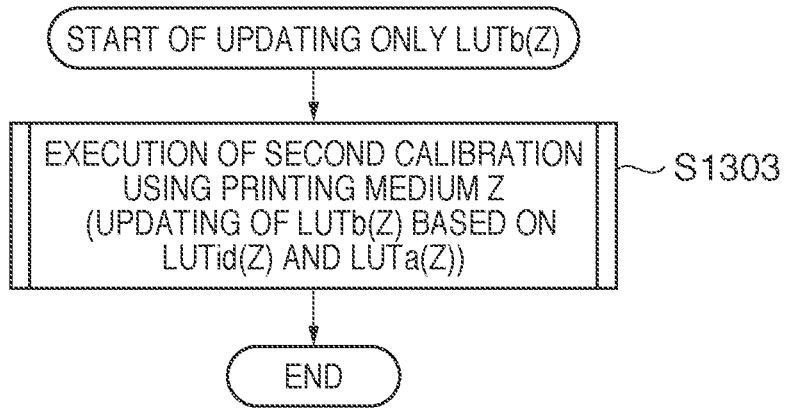
FIG. 13B is a flowchart showing update processing for only the LUTb.

Note that only the LUTb may be updated without updating the LUTa. It suffices to perform only step S1303, as shown in FIG. 13B. Gradation can be easily corrected by updating only the LUTb. In this case, however, density improvement or gradation correction at a dark portion on a formed image may be further restricted. This is because the first calibration is omitted and no contrast is set. In addition, UCR processing is done for image signals, the sum of which becomes equal to or larger than a predetermined value. Even so, the advantage of easily adjusting the gradation of a bright portion on the image is important.

III. Third Calibration

The second calibration adjusts the image processing condition based on the luminance value of an image read from a printing medium by the reading means. The second calibration corresponds to calculation mode A in which an image is formed on a printing medium and the image formed on the printing medium is read to adjust the image processing condition used to form an image. However, the second calibration cannot be performed if the operator has neither the first printing medium X nor the added second printing medium Z. Even if the operator has both of these printing media, he may want to reduce the number of printing media used in terms of the operational cost. Under the circumstances, the third calibration using no printing medium is proposed.

The third calibration is processing of removing an image from the image carrier without transferring it onto a printing medium and, after the detection means detects the image density, adjusting the image processing condition based on the density detected by the detection means and target data. The third calibration corresponds to calibration mode B in which an image is formed on the image carrier and the image formed on the image carrier is read to adjust the image processing condition used to form an image.

The third calibration is performed once or a plurality of times until the second calibration is performed next time after it was performed. The graduation characteristic can be maintained at a certain level without performing the second calibration.

In the third calibration, the photosensor 170 reads the third pattern image formed on the photosensitive drum 121 using the developing material, and the image processing condition (for example, LUTa) is adjusted based on the read value and target data. For this purpose, the target data needs to be determined in advance. Generally, the second calibration can be performed to adjust the graduation characteristic of the printer unit B to an ideal one. Thus, target data for the third calibration is determined immediately after execution of the second calibration. Note that the target data determination processing may be performed once every time the second calibration is performed once or a plurality of number of times. This is because target data for the third calibration is considered not to change so greatly when the second calibration is performed at a relatively short interval. The CPU 301 may determine whether to perform the target data determination processing in accordance with the time interval between the previous and current execution timings of the second calibration. For example, the determination processing is performed when the execution interval exceeds a threshold, and is not performed when it is equal to or shorter than the threshold. Alternatively, the CPU 301 may determine whether to perform the target data determination processing in accordance with the number of images formed till the current execution timing of the second calibration after the previous execution timing. For example, the determination processing is performed when the number of images exceeds a threshold, and is not performed when it is equal to or smaller than the threshold. In this manner, various execution conditions (triggers) are conceivable for the target data determination processing. It suffices to set an execution condition capable of maintaining the image quality within a permissible range.

<Target Data (Target Table) Determination Processing>

FIG. 14 is a flowchart showing processing of determining target data used as a reference in the third calibration. When a predetermined execution condition is satisfied, the CPU 301 starts target data determination processing. The simplest condition among assumed execution conditions is the end of the second calibration.

In step S1401, the CPU 301 sets, in the tone control unit 311, the LUTa and LUTb determined in the second calibration executed immediately before this processing. Also, the CPU 301 sets the tone control unit 311 so that the tone control unit 311 acts on original data of the third pattern image.

In step S1402, the CPU 301 supplies original data of the third pattern image to the color processing unit 303, and controls the printer unit B to form the third pattern image on the photosensitive drum 121. Assume that the memory 302 stores the original data in advance. The original data may be generated by a pattern generator (not shown) or the like. The original data of the third pattern image passes through the tone control unit 311 and thus reflects the second calibration result using a printing medium. The third pattern image may be identical to or different from the second pattern image. The third pattern image has, for example, gradation patches of 10 tones for each of Y, M, C, and Bk. As the patches of 10 tones, 10 tones of low-density regions out of a total of 256 tones can be assigned. Similar to the second pattern image, the third pattern image may include patches for resolution of about 160 to 180 lpi (lines/inch) and those for resolution of about 250 to 300 lpi. To form images of different resolutions, the dither processing unit 307 performs dither processing having parameters corresponding to the resolutions.

In step S1403, the CPU 301 detects the density value of the third pattern image using the photosensor 170. The CPU 301 receives the formation position of each patch and a laser output level used when the patch was formed. Also, the CPU 301 receives a formation position from which the density value was read. The CPU 301 can therefore associate a density value detected for each patch with a laser output level.

In step S1404, the CPU 301 saves the correspondence (graduation characteristic or printer characteristic) between the laser output level and the density value as a target table in the memory 302. The target table is obtained by the printer unit B adjusted to an ideal state by the second calibration, and can be used as target data in the third calibration. That is, the CPU 301 is able to correct the LUTa in the third calibration so that the correspondence between the laser output level and the density value comes close to the target table stored in the memory 302. Note that the number of density values usable to determine the target table is proportional to the number of patches contained in the third pattern image. The number of data may be lacking to create a perfect target table. Hence, the CPU 301 may create any lacking data by interpolating obtained data.

Example of Third Calibration

Figure 15:
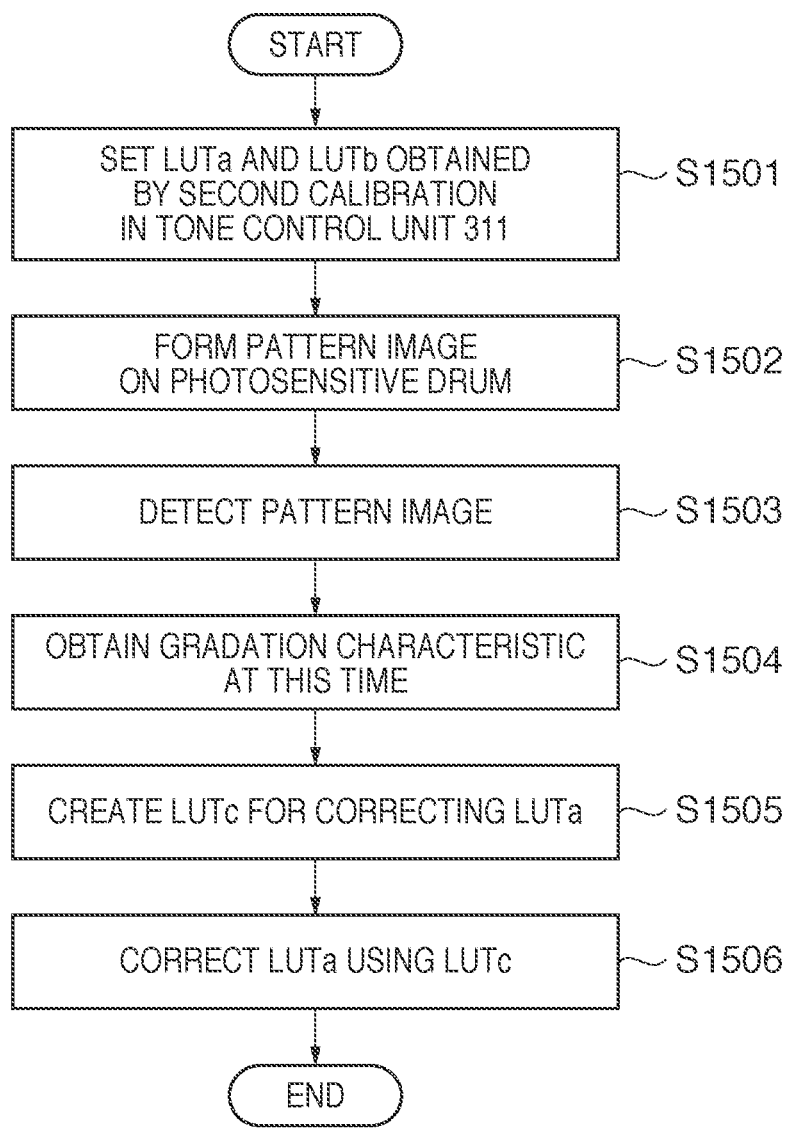
FIG. 15 is a flowchart exemplifying the third calibration.

FIG. 15 is a flowchart exemplifying the third calibration. Note that the third calibration using no printing medium is performed as an alternative to the second calibration using a printing medium. The third calibration is performed once or a plurality of number of times until the second calibration is performed next time after it was performed. The graduation characteristic can be maintained during this interval. The third calibration is performed at the timing when, for example, the time elapsed after execution of the second calibration exceeds a threshold or the number of formed images after execution of the second calibration exceeds a threshold (for example, 1,000 images). Note that the third calibration may be performed at the timing when the operator designates execution of the third calibration via the operation unit 313. The third calibration may also be activated at power up, until display of a message to indicate that the main body of the image forming apparatus becomes usable after the main body is powered.

The CPU 301 manages the number of formed images or the elapsed time by measuring it using a measurement means such as a counter.

Steps S1501 to S1503 are the same as steps S1401 to S1403 described above, so a description thereof will not be repeated.

In step S1504, the CPU 301 obtains a graduation characteristic (printer characteristic) at this time using a density value detected by the photosensor 170. For example, similar to creation of the target table, the CPU 301 creates a characteristic table indicating the correspondence between the density value and the laser output level, and saves it in the memory 302. Note that interpolation processing may be used even at the time of creating the table.

In step S1505, the CPU 301 creates a correction table LUTc for correcting the LUTa set in the tone control unit 311 at this time. For example, the LUTc is a table necessary to convert a given characteristic table into a target table. The LUTc can be created relatively easily by inverse conversion.

In step S1506, the CPU 301 corrects the LUTa set in the tone control unit 311 at this time using the LUTc. For example, a corrected new LUTa' can be created by multiplying the LUTa by the LUTc. The CPU 301 sets the new LUTa' in the tone control unit 311.

By performing the third calibration in this way, the graduation characteristic can be easily maintained without using a printing medium. More specifically, even if the printer characteristic varies depending on the use condition of the image forming apparatus after execution of the second calibration, the image processing condition can be adjusted in the same manner as that when the second calibration is performed. However, the third calibration cannot reflect the influence of each processing or each mechanism after transfer processing on the image quality. Compared to the second calibration, the graduation characteristic adjustment accuracy may degrade slightly.

<Operation (Second Adding Operation) of Adding Second Printing Medium without Using First Printing Medium X>

In the first adding operation described with reference to FIG. 10, the first calibration and second calibration need to be executed first using the first printing medium X in order to add the new second printing medium Z. This is premised on the operator having access to the first printing medium X. If the operator does not have the first printing medium X, he cannot register the second printing medium Z. By performing the third calibration instead of the first calibration and second calibration, the LUTid(Z) and LUTb(Z) are created for the second printing medium Z.

Figure 16:
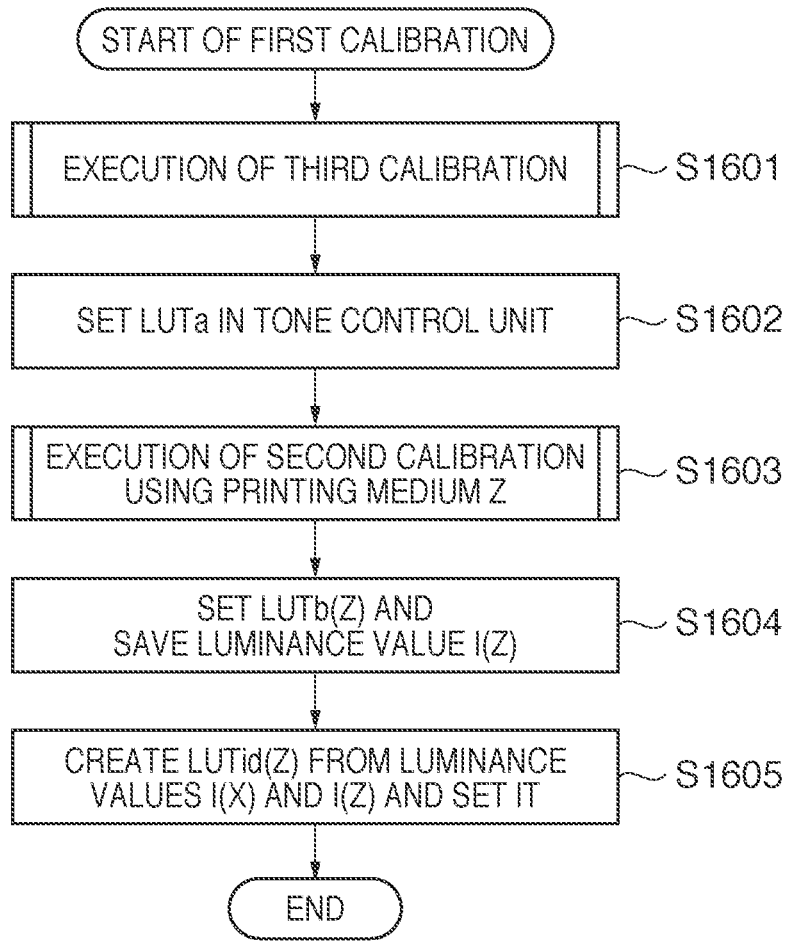
FIG. 16 is a flowchart showing printing medium addition processing using the third calibration.

FIG. 16 is a flowchart showing printing medium addition processing using the third calibration. The CPU 301 creates the second conversion information LUTid(Z) by adjusting the image processing condition using the third calibration and then performing the second calibration using a printing medium to be added.

In step S1601, the CPU 301 performs the third calibration. As the target table, the CPU 301 uses one stored in the memory 302 upon shipment from the factory. Assume that the target table has been created in advance upon shipment from the factory to be able to create an LUTa which makes the quality of a formed image fall within a permissible range. The permissible range assumed upon shipment from the factory may deviate from a range permitted by the user. However, this problem is not so serious because the graduation characteristic is fine-tuned based on an LUTb prepared for each type of printing medium. The CPU 301 uses the initial value of a contrast potential corresponding to the atmosphere environment at this time. Assume that atmosphere environment data such as humidity is measured by a sensor or the like.

In step S1602, the CPU 301 sets the LUTa created by the third calibration in the tone control unit 311. In addition, the CPU 301 sets the LUTid(X) in the color processing unit 303.

In step S1603, the CPU 301 performs the second calibration using the second printing medium Z, creating an LUTb (Z). Since the LUTa has already been created by the third calibration, no LUTa is created by the second calibration in step S1603. Note that the CPU 301 controls an existing LUTb and the UCR unit 305 in the tone control unit 311 not to act on conversion processing, and only the LUTa created by the third calibration to operate in conversion processing. Based on the LUTa, the engine of the printer unit B has been adjusted to a desired characteristic. The CPU 301 knows even the amount of toner applied by the engine. The CPU 301 can therefore obtain the relationship between the amount of applied toner and the luminance value I(Z) of the read image. When performing the second calibration in step S1603, the CPU 301 may create a target table for the third calibration. This is because the latest target table can provide an improved execution result of the third calibration.

In step S1604, the CPU 301 saves, in the memory 302, the LUTb(Z) and luminance value I(Z) obtained by the second calibration. The CPU 301 obtains the luminance value I(Z) from the reader image processing unit 108.

In step S1605, the CPU 301 adds the difference between the luminance values I(X) and I(Z) to the LUTid(X), creating an LUTid(Z) for the second printing medium Z. Assume that the luminance value I(X) is known data stored in advance in the memory 302. Similar to the target table, the luminance value I(X) has been created in advance upon shipment from the factory. As described above, the created LUTid(Z) and LUTb(Z) are stored in the memory 302 in association with identification information indicating the type of printing medium.

In this fashion, the second adding operation can add the second printing medium Z without using the first printing medium X designated by the manufacturer. Compared to the first adding operation, the second adding operation can reduce the number of first printing media X used, and add the second printing medium Z without preparing the first printing medium X. The second adding operation can omit a cumbersome operation to set the first printing medium X bearing a pattern image on the reader unit A and read it. The second adding operation would be more advantageous to the user of the image forming apparatus.

Further, the CPU 301 may control the photosensor 170 to read the density of a pattern image formed on the image carrier when adding the second printing medium Z, and save the density in the memory 302. The CPU 301 converts the density into a target table, thereby creating a target table for the third calibration.

FIGS. 17A and 17B are tables showing how to use the three tables LUTid, LUTa, and LUTb. Assume that calibration is executed in order of i to vi, as shown in FIG. 17A. The table settings remain unchanged even if i and ii are omitted and calibration is performed in order of iii to vi.

At timing i, the first calibration and second calibration are performed for the first printing medium X designated by the manufacturer. As the initial value of the LUTid, the LUTid(X) is set in the tone control unit 311 upon shipment from the factory. By using the LUTid(X), the LUTa(X) and LUTb(X) are created. Since a graduation characteristic specific to the first printing medium X is compensated based on the LUTa (X), the LUTb(X) becomes a linear table in which the input and output are equal. Note that normal image formation performed at the interval between timings i and ii uses the LUTa (X) and LUTb(X).

At timing ii, the third calibration is performed. The LUTa (X) is used to generate the third pattern image. The third calibration updates the LUTa(X) to an LUTa(X)'. Thus, normal image formation performed at the interval between timings ii and iii uses the LUTa(X)' and LUTb(X).

At timing iii, the third calibration is performed to add the second printing medium Z. At this time, the CPU 301 controls the tone control unit 311 to prevent both the LUTa and LUTb from acting on image data. As a result, the LUTa(X)' is updated to an LUTa(X)".

At timing iv, the second calibration is performed to add the second printing medium Z. As described above, an LUTid(Z) and LUTb(Z) are created using the LUTid(X). The LUTa(X)" is used to generate the second pattern image. Normal image formation performed at the interval between timings iv and v uses the LUTa(X)" and LUTb(Z).

At timing v, the first calibration and second calibration are performed using the second printing medium Z. In this way, the CPU 301 performs calibration using the LUTid(Z) prepared for each type of printing medium when performing the second calibration. More specifically, the LUTa(Z) is created using the LUTid(Z). Normal image formation performed at the interval between timings v and vi uses the LUTa(Z) and LUTb(Z).

At timing vi, the third calibration is performed, thereby updating the LUTa(Z) to an LUTa(Z)'. Normal image formation performed at timing vi and subsequent timings use the LUTa(Z)' and LUTb(Z).

The third calibration to add a printing medium is done based on an initial value set as the target upon shipment from the factory. The execution result may contain a small error. However, immediately after a new image forming apparatus is installed in a user room, the building components of the image forming apparatus such as the photosensitive drum and the state of the developing material are almost the same as those upon shipment from the factory. This state is very close to one assumed upon shipment from the factory. Even if no first printing medium X is prepared, the execution result of the third calibration becomes satisfactory. Under the circumstances, gradation can be maintained at higher precision as long as addition processing is performed for the second printing medium Z the user wants to use, immediately after the image forming apparatus is installed. That is, even if the user does not have the first printing medium X designated by the manufacturer, graduation correction can be achieved at relatively high precision. The present invention can improve user friendliness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-178997, filed Aug. 9, 2010, which is hereby incorporated by reference herein in its entirety.

What is claimed is:

1. An image forming apparatus comprising:
a first reading unit configured to read a pattern image formed on a first printing medium to obtain a first luminance value;
a first creation unit configured to convert the first luminance value into a density value using first conversion information and to create an image processing condition based on the density value;
a second reading unit configured to read a pattern image formed on an image carrier;
a correction unit configured to correct the image processing condition created by the first creation unit based on the pattern image read by the second reading unit;
a determination unit configured to form a pattern image on a second printing medium different from the first printing medium using the image processing condition corrected by the correction unit, and to determine second conversion information for converting luminance values into a density value for the second printing medium based on a second luminance value obtained by reading the pattern image on the second printing medium, the first luminance value, and the first conversion information; and
a second creation unit configured to convert a luminance value obtained by reading the pattern image formed on the second printing medium into a density value using the determined second conversion information, and to create an image processing condition based on the density value obtained using the determined second conversion information.

2. The apparatus according to claim 1, further comprising:
a regulation unit configured to regulate a sum of use amounts of developing materials of respective colors in image data not to exceed a predetermined value; and
a modification unit configured to modify graduation characteristics of the image forming apparatus by using the image processing conditions to modify image data, the sum of which has been regulated by said regulation unit.

3. The apparatus according to claim 1, wherein the correction unit corrects the image processing condition created by the first creation unit once or a plurality of number of times until the first creation unit creates the image processing condition next time after the first creation unit creates the image processing condition.

4. The apparatus according to claim 1, further comprising a management unit configured to manage the number of images formed in the image forming apparatus upon completion of creating the image processing condition created by the first creation unit,
wherein the correction unit corrects the image processing condition created by the first creation unit when the number of images exceeds a predetermined threshold.

5. The apparatus according to claim 1, further comprising a management unit configured to manage a time elapsed upon completion of creating the image processing condition created by the first creation unit,
wherein the correction unit corrects the image processing condition created by the first creation unit when the elapsed time exceeds a predetermined threshold.

6. An image forming apparatus comprising:
a first reading unit configured to read a pattern image formed on a first printing medium to obtain a first luminance value;
a creation unit configured to convert the first luminance value into a density value using conversion information and creating an image processing condition based on the density value;
a second reading unit configured to read a pattern image formed on an image carrier;
a correction unit configured to correct the image processing condition created by the creation unit based the pattern image read by the second reading unit;
a determination unit configured to form a pattern image on a second printing medium different from the first printing medium using the image processing condition corrected by the correction unit, and to determine second conversion information for converting luminance values into a density value for the second printing medium based on a second luminance value obtained by reading the pattern image on the second printing medium, the first luminance value, and the first conversion information;
a regulation unit configured to regulate a sum of use amounts of developing materials of respective colors in image data not to exceed a predetermined value; and
a modification unit configured to modify graduation characteristics of the image forming apparatus by using the image processing conditions to modify image data, the sum of which has been regulated by said regulation unit.

7. An image forming apparatus comprising:
a correction unit configured to correct image data using a correction condition;
an image forming unit including:
an exposure unit configured to emit a light beam based on the corrected image data,
an image carrier configured to carry a toner image formed in accordance with the light beam, and
a transferring unit configured to transfer the toner image onto a recording material;
a measuring unit configured to measure a measurement image formed on the image carrier by the image forming unit;
an obtaining unit configured to obtain read data acquired by a reading unit reading a measurement image formed on the recording material by the image forming unit;
a converting unit configured to convert the read data into density data using a conversion condition corresponding to the recording material;
a first generation unit configured to generate the correction condition based on the density data converted by the converting unit;
a second generation unit configured to generate the correction condition based on a measurement result measured by the measuring unit;
a storage unit configured to store a first read data corresponding to a patch image formed on a reference recording medium and a first conversion condition corresponding to the reference recording medium; and
a third generation unit configured to:
control the correction unit to correct a patch image data using the correction condition generated by the second generation unit,
control the image forming unit to form a patch image on a target medium different from the reference recording medium based on the corrected patch image data, and
generate a second conversion condition corresponding to the target medium using a second read data obtained by the obtaining unit that is obtained by the reading unit reading the patch image formed on the target medium, the first read data and the first conversion condition stored in the storage unit.

8. The image forming apparatus according to claim 7, wherein the second conversion condition which is generated by the third generation unit is stored by associating with the target medium.

9. The image forming apparatus according to claim 7, further comprising:
   an input unit configured to input information indicating a type of a recoding medium; and
   a selection unit configured to select a conversion condition corresponding to the recording medium based on the information inputted by the input unit,
   wherein the converting unit is further configured to convert the read data using the selected conversion condition.

10. The image forming apparatus according to claim 7, wherein the first read data is obtained by the reading unit reading the patch image formed on the reference recording medium by the image forming unit.

11. The image forming apparatus according to claim 7, wherein the third generation unit is further configured to generate the second conversion condition based on a difference between the second read data and the first read data, and the first conversion condition.

12. The image forming apparatus according to claim 7, wherein the read data is a luminance value.

13. The image forming apparatus according to claim 7, wherein the measuring unit includes:
   a light emitting unit configured to emit light for the image carrier; and
   a light receiving unit configured to receive reflected light from the measurement image on the image carrier,
   wherein the measuring unit further configured to measure the measurement image based on the reflected light received by the light receiving unit.

14. The image forming apparatus according to claim 7, wherein the measuring unit is further configured to measure a density of the measurement image.

* * * * *